(12) United States Patent
Chong et al.

(10) Patent No.: US 10,512,021 B2
(45) Date of Patent: Dec. 17, 2019

(54) SYSTEM AND METHOD FOR PROVIDING CONTINUOUS COMMUNICATIONS ACCESS TO SATELLITES IN GEOCENTRIC, NON-GEOSYNCHRONOUS ORBITS

(71) Applicant: Kepler Communications Inc., Toronto (CA)

(72) Inventors: Wen Cheng Chong, Toronto (CA); Mina Mitry, Mississauga (CA)

(73) Assignee: Kepler Communications Inc., Toronto (CA)

( * ) Notice: Subject to any disclaimer, the term of this patent is extended or adjusted under 35 U.S.C. 154(b) by 293 days.

(21) Appl. No.: 15/258,528

(22) Filed: Sep. 7, 2016

(65) Prior Publication Data

US 2017/0070939 A1     Mar. 9, 2017

Related U.S. Application Data

(60) Provisional application No. 62/215,312, filed on Sep. 8, 2015.

(51) Int. Cl.
*H04W 36/36*      (2009.01)
*H04W 36/32*      (2009.01)
(Continued)

(52) U.S. Cl.
CPC ........ *H04W 36/36* (2013.01); *H04B 7/18513* (2013.01); *H04B 7/18521* (2013.01);
(Continued)

(58) Field of Classification Search
CPC ................ H04B 7/195; H04B 7/18504; H04B 7/18521; H04B 7/155; H04B 7/185;
(Continued)

(56) References Cited

U.S. PATENT DOCUMENTS 5,758,261 A    5/1988   Takehana et al.
5,410,728 A    4/1995   Bertiger et al.
(Continued)

FOREIGN PATENT DOCUMENTS

EP        0588697      3/1994

OTHER PUBLICATIONS

Catherine Venturini, Thom McVittie: "GSAW 2014—Session 11C Current and Future Ground Systems for CubeSats Working Group"; Aerospace Assuring Space Mission Success; gsaw.org/wp-content/uploads/2014/03/2014s11c_venturini_mcvittie.pdf; Jan. 21 2014.

*Primary Examiner* — Margaret G Mastrodonato
(74) *Attorney, Agent, or Firm* — Ridout & Maybee LLP

(57) ABSTRACT

A system including a constellation of satellites in Low Earth Orbit and a plurality of ground stations to enable continuous communication for other geocentric, non-geosynchronous spacecraft. Network latency, Doppler effects, and router handover time are minimized through selection of orbital parameters for the satellite constellation and locations of ground stations. A plurality of polar or near polar orbit planes is presented at equally spaced right ascension of the ascending node (RAAN), in an alternative ascending-descending pattern. Inter-satellite communication is performed in-plane to relay data to a ground station, and out-of-plane or in-plane to communicate with another satellite that is not a member of the constellation. The number and location of ground stations is selected based on the number of small satellites and orbital planes in order to maintain continuous communications. The system can enable continuous communication for geocentric satellites without the need for line-of-sight access to a ground station.

33 Claims, 20 Drawing Sheets

(51) Int. Cl.
*H04W 84/06* (2009.01)
*H04B 7/185* (2006.01)
*H04B 7/195* (2006.01)
*H04L 12/64* (2006.01)

(52) U.S. Cl.
CPC ............ *H04B 7/195* (2013.01); *H04W 36/32* (2013.01); *H04W 84/06* (2013.01); *H04B 7/1851* (2013.01); *H04L 2012/6421* (2013.01)

(58) Field of Classification Search
CPC .... H04B 7/1851; H04B 7/19; H04B 7/18513; H04W 36/32; H04W 36/36; H04W 72/04; H04W 84/06
See application file for complete search history.

(56) References Cited

U.S. PATENT DOCUMENTS

| | | |
|---|---|---|
| 5,604,920 A | 2/1997 | Bertiger et al. |
| 5,634,190 A | 5/1997 | Wiedeman |
| 5,911,389 A | 6/1999 | Drake |
| 5,978,653 A * | 11/1999 | Taylor ............ H04B 7/195 455/13.1 |
| 6,032,902 A | 3/2000 | Palmade et al. |
| 6,198,907 B1 | 3/2001 | Torkington et al. |
| 6,249,513 B1 | 6/2001 | Malarky |
| 6,556,808 B1 | 4/2003 | De La Chapelle et al. |
| 6,823,170 B1 | 11/2004 | Dent |
| 6,868,316 B1 | 3/2005 | Stevens |
| 6,931,248 B2 | 8/2005 | Borel |
| 6,985,454 B1 | 1/2006 | Wiedeman |
| 7,370,566 B2 | 5/2008 | Furman |
| 8,360,366 B1 * | 1/2013 | Chung ............ B64G 1/1007 244/158.4 |
| 2002/0017593 A1* | 2/2002 | Castiel ............ B64G 1/1007 244/158.4 |
| 2007/0117509 A1* | 5/2007 | Wang ............ H04B 7/195 455/12.1 |
| 2012/0184208 A1* | 7/2012 | Renouard ......... H04B 7/18521 455/12.1 |
| 2014/0002757 A1 | 1/2014 | Nagami |
| 2014/0021824 A1 | 1/2014 | Gayosso et al. |
| 2014/0222472 A1 | 8/2014 | Platzer |
| 2017/0026108 A1* | 1/2017 | Haziza ............ H04B 1/707 |
| 2017/0070939 A1* | 3/2017 | Chong ............ H04W 36/36 |

* cited by examiner

SYSTEM AND METHOD FOR PROVIDING CONTINUOUS COMMUNICATIONS ACCESS TO SATELLITES IN GEOCENTRIC, NON-GEOSYNCHRONOUS ORBITS

CROSS-REFERENCE TO RELATED APPLICATION(S)

This application claims the benefit of priority to U.S. Provisional Patent Application No. 62/215,312 filed Sep. 8, 2015 entitled SYSTEM AND METHOD FOR PROVIDING CONTINUOUS COMMUNICATIONS ACCESS TO SATELLITES IN GEOCENTRIC, NON-GEOSYNCHRONOUS ORBITS, the contents of which are herein incorporated by reference into the Detailed Description of Example Embodiments herein below.

FIELD

Example embodiments generally relate to telecommunications services for satellites, for example for satellite to ground station communication and/or satellite to satellite communication.

BACKGROUND

The number and frequency with which satellites are being launched into orbit continues to increase. With standardization and miniaturization of satellite components, space access is now open, not only to large national agencies, but also small countries, academia, and private enterprises. Despite the newfound adoption of satellite technologies, the functionality of geocentric, and in particularly Low Earth Orbit (LEO) satellites, is limited by the need for line-of-sight connection with a ground station in order to downlink data or spacecraft telemetry, as well as uplink commands. This limitation means that a satellite operator may only be able to communicate with their satellite over some fraction of the entire service life of the vehicle.

Additional difficulties with existing systems may be appreciated in view of the Detailed Description of Example Embodiments, herein below.

SUMMARY

At least some example embodiments relate to a small satellite constellation architecture in LEO to enable continuous communications services for other geocentric satellites. The continuous communication is performed by relaying data to the aforementioned small-satellite constellation via an inter-satellite link, and a set of strategically placed ground stations.

An example embodiment includes a constellation of satellites in polar or near polar orbit (including sun-synchronous) that allows continuous access to other satellites in LEO. The system contains three distinct segments: the network segment, the user segment, and the ground segment. The network segment includes the satellites within the constellation in LEO that are designated for relaying data to the ground segment. This network segment consists of a plurality of satellites in orbits of similar inclination, equally spaced about the right ascension of the ascending node (RAAN), and within each orbit there are a plurality of satellites equally spaced about the mean anomaly. The orbits are chosen such that there is an alternating ascending-descending pattern between adjacent planes, which minimizes spacecraft handover and the effects of Doppler shift between the user and network segment. The user segment includes any geocentric satellite within communications range of the network segment. The ground segment consists of a plurality of ground stations strategically selected in order to maintain constant and high data capacity communications with the network segment. This ground segment is also connected to the data distribution system for distribution of satellite data to the end user over the Internet.

Another example embodiment is a system for providing communications access to satellites, the system includes a plurality of network satellites surrounding Earth each in one of a plurality of orbital planes, wherein network satellites in adjacent orbital planes traverse the respective orbital planes in opposite directions from each other, each network satellite further includes a respective communications subsystem configured to communicate with at least one external device which is external to the plurality of network satellites.

Another example embodiment is a method for providing communications access to a plurality of network satellites surrounding Earth each in one of a plurality of orbital planes, wherein network satellites in adjacent orbital planes traverse the orbital planes in opposite directions from each other, each network satellite further includes a respective communications subsystem. The method includes receiving, at a first network satellite of the plurality of network satellites, data from a first external device which is external to the plurality of network satellites, and transmitting, from the first network satellite, the received data to a second external device station when the first network satellite is within a line-of-sight (LOS) of the first network satellite.

BRIEF DESCRIPTION OF THE DRAWINGS

Reference will now be made, by way of example, to the accompanying drawings which show example embodiments, and in which.

Similar reference numerals may have been used in different figures to denote similar components.

DETAILED DESCRIPTION OF EXAMPLE EMBODIMENTS

Large constellations of small satellites are being used today in practical applications such as global mapping, large asset tracking, emissions monitoring, and scientific research. A key limitation of such constellations is their data downlink capacity; with this limitation expecting to become more problematic as there becomes increasing demand for satellite data. A recent workshop at NASA's Jet Propulsion Laboratory (Venturini & McVittie, *GSAW 2014—Session 11C Current and Future Ground Systems for CubeSats Working Group*) claimed that currently there is a need for around 200-2,000 MB/day from an individual small satellite, with latency (source to ground) being around 90 minutes, or one orbital period. This number is predicted to grow to nearly 1 TB/day, with network latency of milliseconds (e.g. real-time) becoming necessary as demand for satellite services continues to increase.

Conventionally, operators use a set of dedicated ground stations in order to receive data from satellites. However, geopolitical and land constraints prevent ground stations from covering the entirety of the Earth. Coupled with complex handover procedures as satellites change between coverage regions, means that they are incapable of providing true continuous communications access to LEO satellites.

Therefore, as recognized herein, it is becoming a necessity to consider a constellation of satellites, which are dedicated to data relaying, with inter-satellite links to address the growing need for real-time data.

Figure 1:
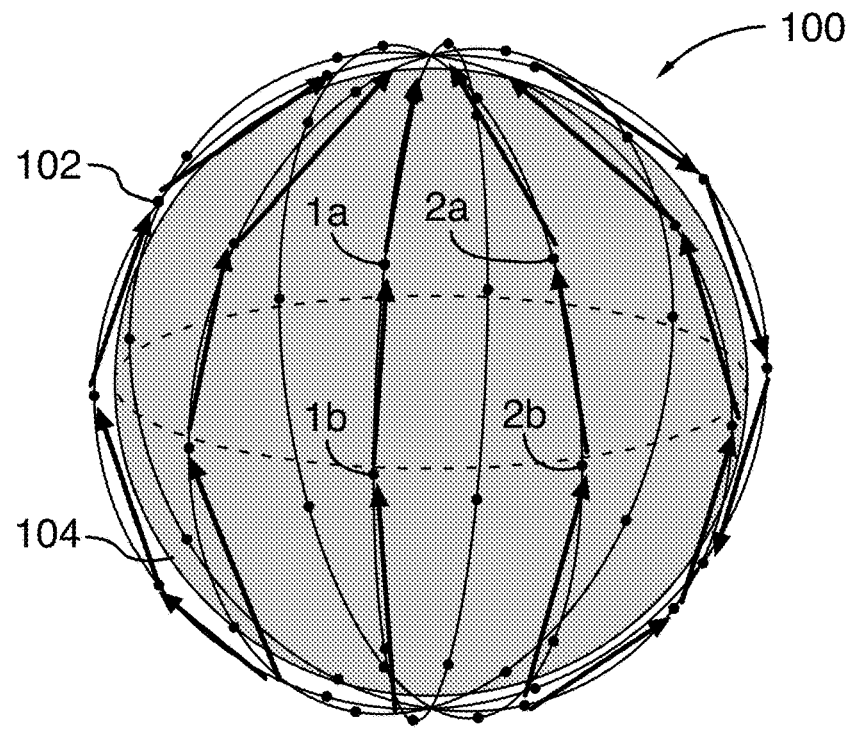
FIG. 1 illustrates a side elevation view showing an example of a conventional polar constellation.

Conventionally, a satellite constellation design with inter-satellite communication capabilities found in prior art has an orbital pattern 100 as shown in FIG. 1, where the satellites 102 are travelling in the same direction (towards the North Pole or South Pole) for half of the Earth 104 or other planet. An arbitrary number of 50 satellites in 5 polar orbit planes and 10 satellites in each orbit plane for providing continuous ground telecommunications services are illustrated. In FIG. 1, the network satellites are illustrated by circular dots. As shown in FIG. 1, there are two satellites 1a, 1b in the same orbit and another are two satellites 2a, 2b in the adjacent orbit travelling in the same direction as satellites 1a, 1b.

Figure 2:
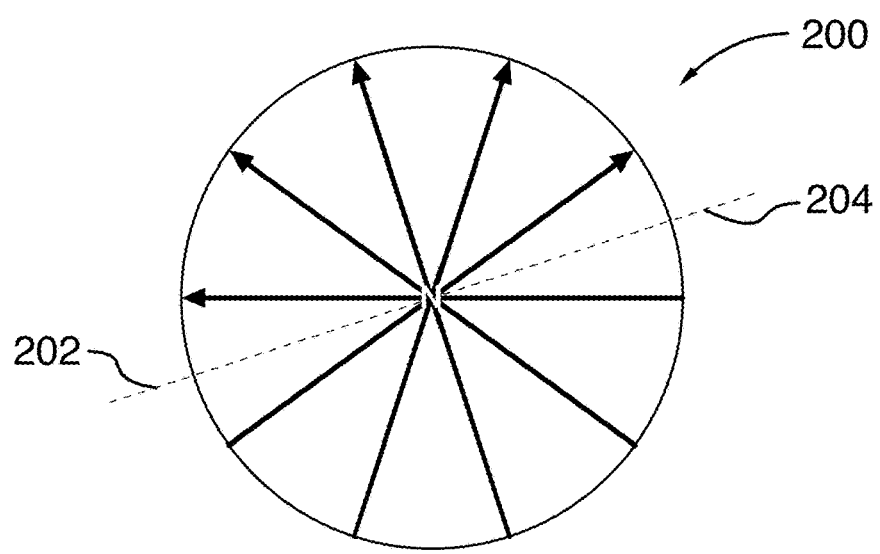
FIG. 2 illustrates a polar view of the conventional constellation shown in FIG. 1.

FIG. 2 shows the polar view of the constellation 200 found in prior art, which shows that there exist two orbital "seams" 202, 204 in the constellation, indicated by the dotted lines, wherein adjacent satellites are travelling in opposite directions (e.g. counter-rotating planes).

Figure 3:
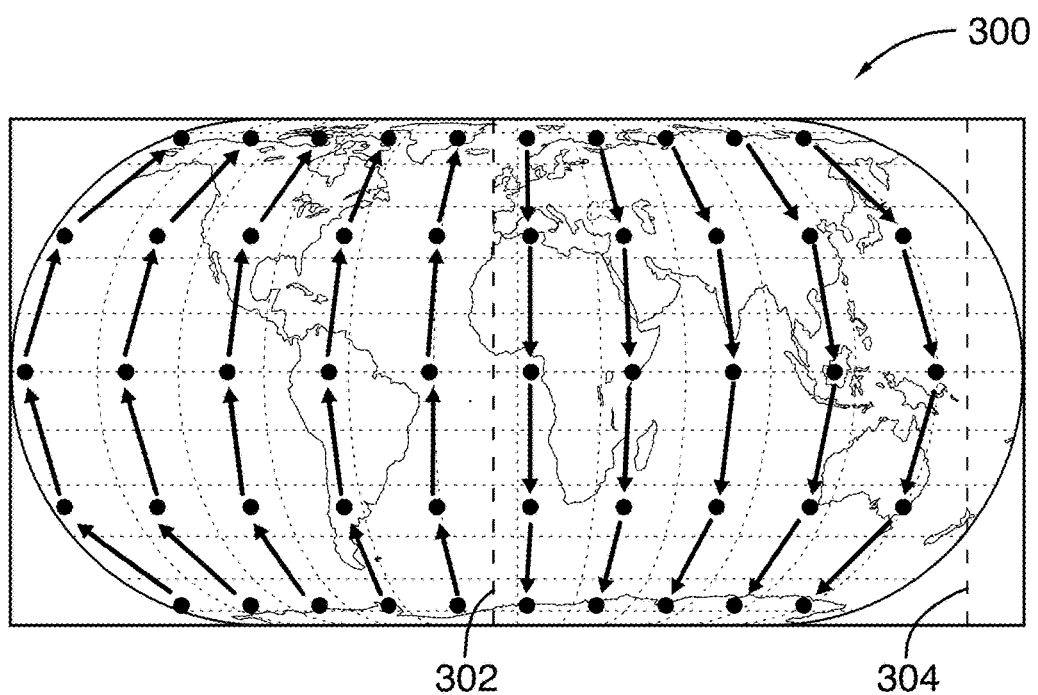
FIG. 3 illustrates a 2D schematic view of the conventional constellation shown in FIG. 1.

For further clarity, FIG. 3 shows the two dimensional schematic view of the constellation 300 found in prior art. Dotted lines indicate orbital seams 302, 304 where adjacent satellites are moving in opposite directions (e.g. one ascending, moving towards North Pole and one descending, moving away from North Pole). It has been noted in the prior art that satellites in this constellation do not communicate cross-seam since the inter-satellite link hand-offs have to happen very rapidly and cope with large Doppler shifts.

Figure 4:
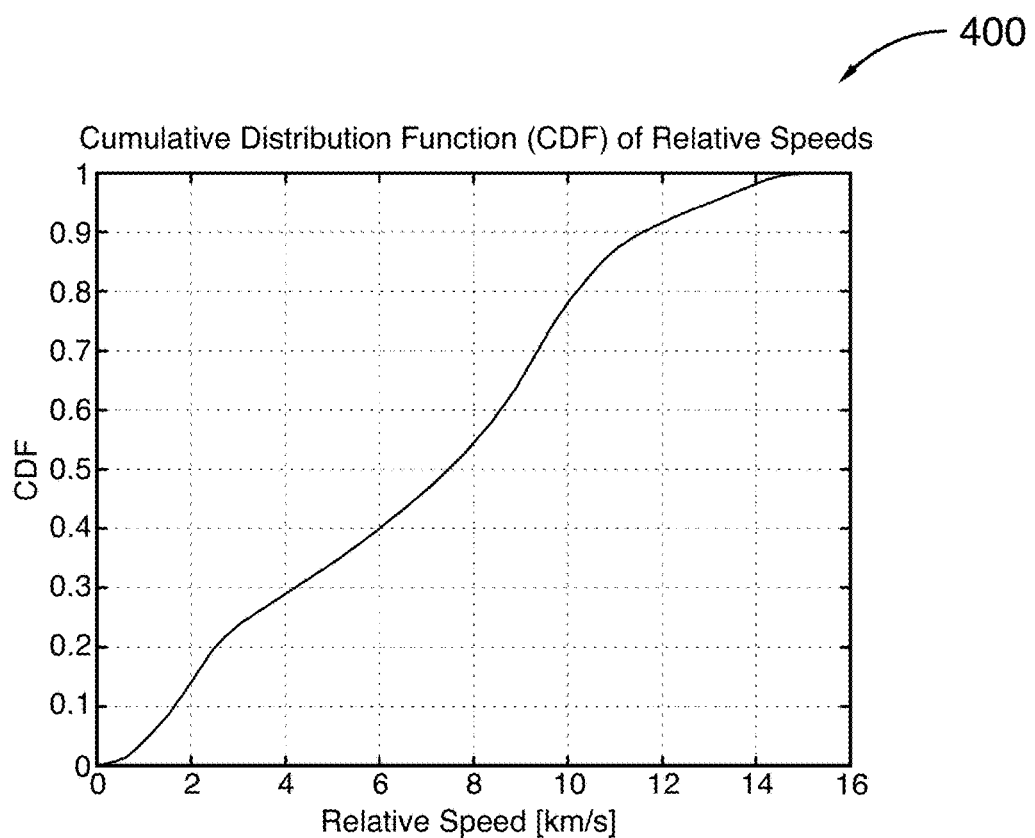
FIG. 4 illustrates a graph showing a result of a Monte Carlo simulation showing the cumulative distribution function (CDF) of the relative speed of a user satellite with respect to the conventional satellite constellation found in prior art.
Figure 5:
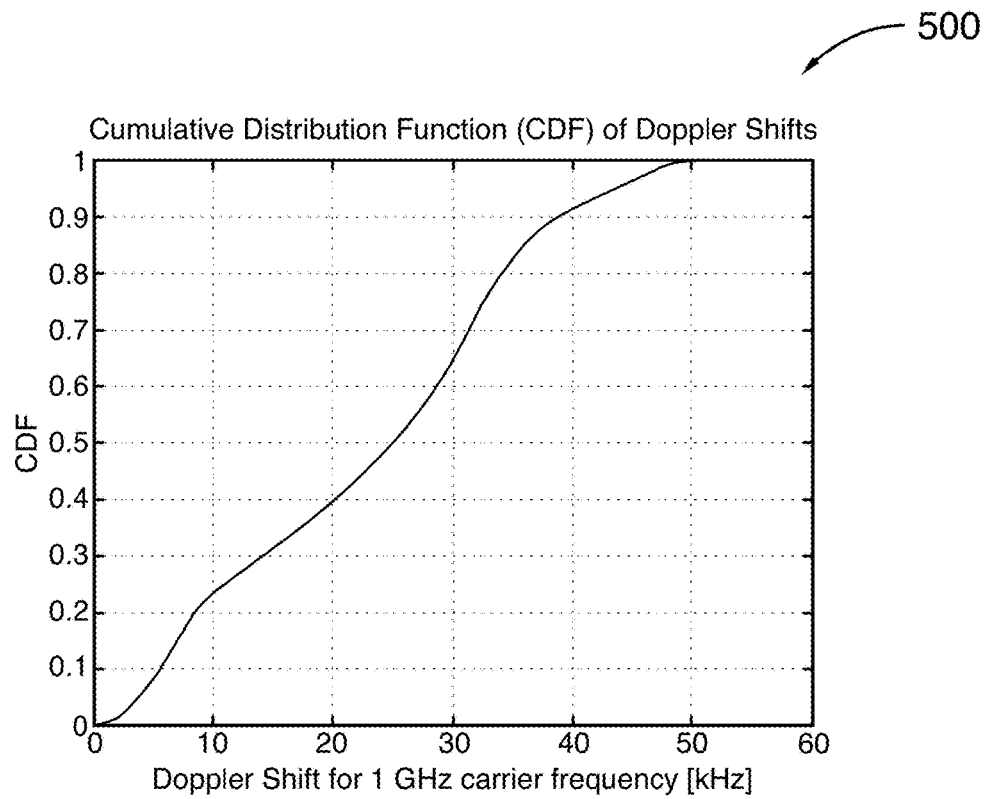
FIG. 5 illustrates a graph showing a result of a Monte Carlo simulation showing the CDF of the Doppler Shift that a user satellite has to cope with when communicating with the conventional satellite constellation found in prior art.

As the satellite constellation found in the prior art is often designed specifically for providing satellite cellular telephone services among a plurality of ground-based users, there exist various limitations when a space-based asset, for example a user satellite external to the satellite constellation, attempts to communicate with the satellite constellation. More specifically, the relative speed between a user satellite in an arbitrary orbit and the satellite constellation found in the prior art can be high. FIGS. 4 and 5 show a Monte Carlo simulation that illustrates the distribution of relative speeds and the resulting Doppler shifts for user satellites when communicating with the satellite constellation found in prior art. The simulation randomly sampled possible orbits for the user satellite in altitudes ranging from 300 to 800 km, random inclinations and Right Angle of Ascending Nodes (RAAN)s. Using these sampled orbits, a random position and direction along the orbit is sampled to identify which satellite in the prior art constellation the user satellite can communicate with via line of sight. In every case, the satellite in the constellation that minimizes the Doppler shift, or equivalently, the relative speed is chosen. Aggregating this data, the figures show that 50% of the time the user satellite are communicating with the satellite constellation found in prior art at a relative speed above the satellite orbital velocity of approximately 7.5 km/s with a Doppler shift of over 25 kHz per GHz. Assuming that the orbital velocity is the threshold at which a reliable inter-satellite link can be established, the satellite constellation found the prior art can only provide communication services to 50% of the user satellite.

FIG. 4 is a graph of a Monte Carlo simulation 400 showing the cumulative distribution function (CDF) of the relative speed of a user satellite with respect to the conventional satellite constellation found in prior art. As well, FIG. 5 is a graph of a Monte Carlo simulation 500 showing the CDF of the Doppler Shift that a user satellite has to cope with when communicating with the conventional satellite constellation found in prior art.

Uses of the System and Overall System Architecture

Example embodiments generally relate to a communication system that provides continuous network access to other spacecraft in any geocentric orbit. Having continuous access to the spacecraft allows for analysis and mission planning to be done based on real-time satellite data. This system unlocks the capability for satellite operators to provide global air traffic management, global aircraft and ship tracking, global disaster relief and emergency services, border patrol and weather monitoring, just to name a few, all based on live imagery and real time satellite data.

Figure 6:
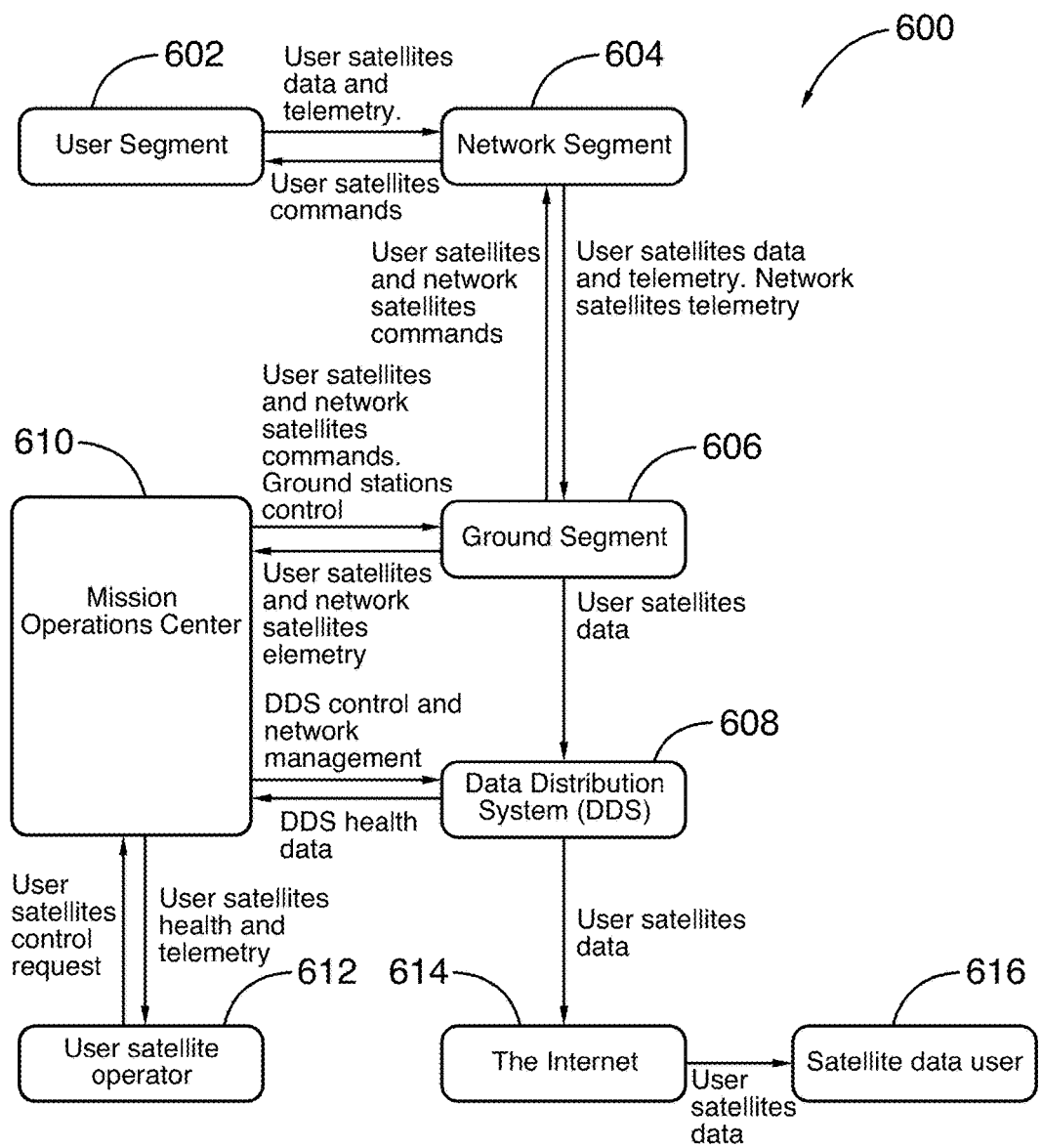
FIG. 6 illustrates a block diagram of an overall architecture of the system to enable constant communications with space assets according to an example embodiment.

Referring now to FIG. 6, the system 600 of an example embodiment includes three distinct segments: the network segment, the user segment and the ground segment. FIG. 6 shows the overall architecture of the system 600 and the interaction between the segments and various stakeholders, including the flow of information from user segment to end-user. As shown in FIG. 6, the network segment 604 relays the collected data on the user segment 602, such as imagery, tracking signal or weather data to the ground segment 606, which is then transferred to the data distribution system 608 to be sent to the satellite data user 616 through the Internet 614. At the same time, satellite telemetry and housekeeping data are relayed to the ground segment 606 through the use of network segment 604, which is then sent to the mission operations center 610 for satellite telemetry and health monitoring, satellite control planning and mission planning and scheduling. A user satellite operator 612 may send control requests to the user satellites and may receive user satellite health and telemetry information from the mission operations center 610. Conversely, satellite commands are generated by the mission operations center 610 and transmitted to the ground segment 606, which is then relayed, via the network segment 604, to the user segment 602, in order to control the satellites in the user segment 602. Satellites in the network segment 604 are also commanded by the mission operations center 610 in a similar way. Furthermore, the mission operations center 610 also interacts with the data distribution system 608 to perform network management tasks such as network load monitoring and data security management. Both the data distribution system 608 and the ground stations in the ground segment 606 are controlled directly by the mission operations center 610.

Network Segment Constellation Design

The network segment includes the satellites within the constellation that are designated for relaying data to the ground segment. In an example embodiment, small satellites following the 3U CubeSat form factor are used as the network satellites in the network segment, as understood in the art. These satellites are mainly deployed for the communication relay purposes and would dedicate a large portion of its available resources such as mass, volume and power to enhancing the communication link with space assets in the user segment and with the ground segment. The main payload of these small satellites in the network segment is the communication subsystem, consisting of multiple transceiver units and antennas. In another embodiment, due to the global Earth coverage of small satellites in the network segment, tracking signal receiver may be installed on these satellites to perform global aircraft, ship or animal tracking.

Figure 7:
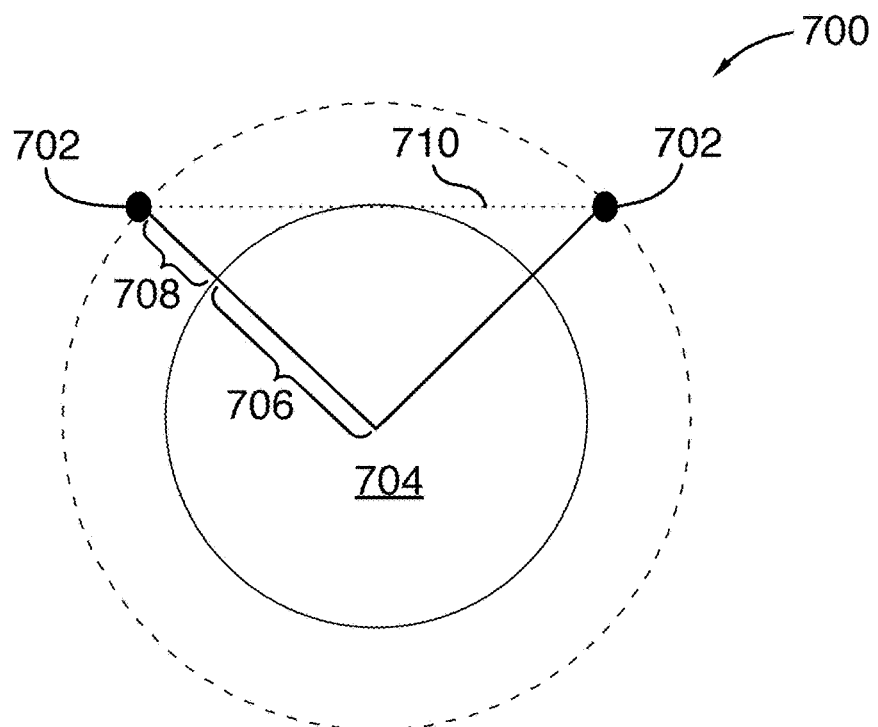
FIG. 7 illustrates a schematic showing satellite line-of-sight (LOS) dependency on the satellite altitude and radius of the Earth according to an example embodiment.

An inter-satellite link (ISL) is needed between co-planar network satellites, as well as user to network links. Generally, inter-satellite communication is, at best, limited by a line-of-sight (LOS) connection to an adjacent satellite, as shown in the schematic 700 of FIG. 7. For the ISL, there are a plurality of orbital seams wherein adjacent satellites 702 are moving in opposite directions (e.g. one ascending, moving towards North Pole and one descending, moving away from North Pole). LOS 710 can be calculated based on a given orbital altitude (a) 708 as $$LOS = 2\sqrt{(R_e + a)^2 - R_e^2}$$

where $R_e$ is the radius 706 of the Earth 704. The minimum number of satellites required to establish coverage of the given orbit at any altitude ($N_{SAT}$) is given as $$N_{SAT} = \text{ROUND UP}\left(\frac{2\pi(R_e + a)}{LOS}\right)$$

and the minimum number of satellites for global coverage ($N_{SAT\ GLOBAL}$) is therefore given as $$N_{SAT\ GLOBAL} = N_{SAT} * \frac{N_{SAT}}{2}$$

assuming equal spacing along lines of longitude and latitude. For example, at an altitude of 600 km, the LOS distance is approximately 5,660 km with an $N_{SAT}$ of 8 and an $N_{SAT\ GLOBAL}$ of 32. This means that a minimum constellation of 32 satellites (8 satellites in 4 orbit planes) is required for global continuous communications for other satellites. Practically speaking, the number of satellites employed in a constellation for global coverage is greater than the calculated $N_{SAT}$ GLOBAL for system redundancy and consideration of the communication link distance and minimum communication link altitude.

Figure 8:
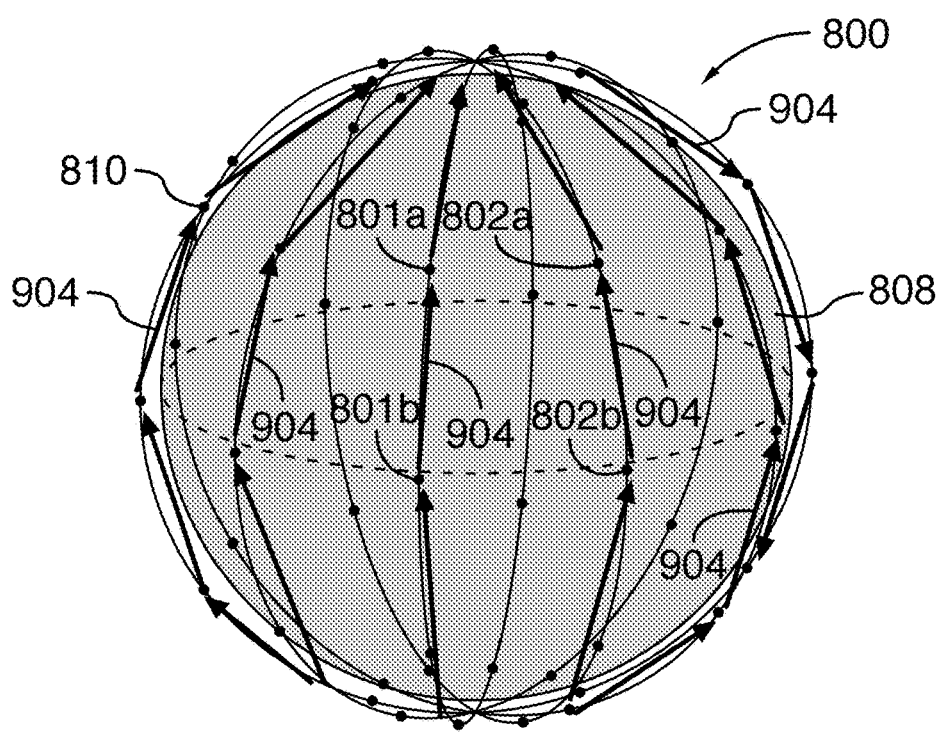
FIG. 8 illustrates a side elevation view of polar constellations for 50 satellites in 5 orbit planes, with 10 satellites in each orbit plane, for providing continuous satellite communications in LEO, according to an example embodiment.

In an example embodiment, as shown in FIG. 8, the constellation 800 traversing the Earth 808 contains fifty satellites 810, consisting of ten satellites in five polar or near polar planes 904 (including Sun Synchronous Orbit), with RAAN and Mean Anomaly separation both of 36°. In an example embodiment, each of the network satellites 810 are configured to be non-geosynchronous. As shown in FIG. 8, there are two satellites 801a, 801b in the same orbital plane 904 and another are two satellites 802a, 802b in the adjacent orbit 904 travelling in the same opposite as satellites 801a, 801b. The satellites 810 may surround the Earth in Low Earth Orbit (LEO). LEO is an orbit around Earth with an altitude generally between 160 kilometers and 2,000 kilometers. For example, with an altitude of 600 km, the resulting inter-satellite communication link distance is around 4,400 km. The constellation 800 has orbital seams wherein adjacent satellites 810 are moving in opposite directions (e.g. one ascending, moving towards North Pole and one descending, moving away from North Pole). In this arrangement, the communications signal bore sight at closest approach (e.g. the minimum communication link altitude) passes within around 250 km to ground, which minimizes interference with ground communications in the case of radio and atmospheric disturbances in the case of optical communications. Note that the atmospheric disturbances start becoming an issue at altitude of less than 100 km, also known as the Karman line. Reducing the number of satellite elements or orbital planes 904 can cause radio signal to pass within an unacceptable distance to the ground (e.g. 40 km in the case of eight satellites in four orbit planes). Increasing the number of elements or planes can decrease inter-satellite link distance, resulting in an improvement in the communication link strength. However, this arrangement of fifty satellites 810 in five orbit planes is considered a practical minimum for global coverage.

Alternatively, constellation containing greater than ten satellites in each orbit in greater than five polar or near polar orbit planes may be employed to achieve global coverage. For example, a constellation containing ninety-eight satellites, consisting of fourteen satellites in seven polar or near polar planes with RAAN and Mean Anomaly separation both of approximately 26° can also be used for global coverage. At an altitude of 600 km, the resulting inter-satellite communication link distance is around 3,100 km. This shows an approximately 30% decrease in the inter-satellite link distance at the cost of twice the number of satellites.

Figure 9:
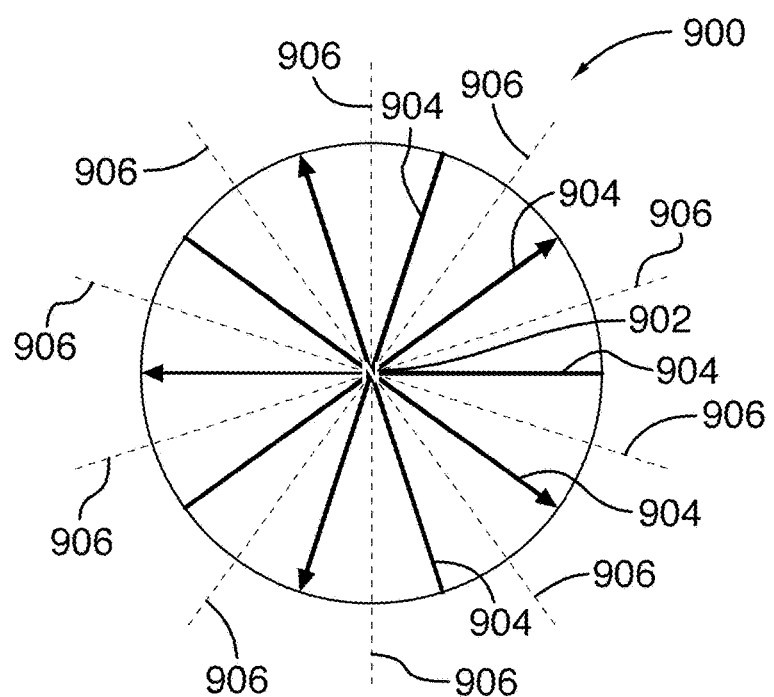
FIG. 9 illustrates a polar view of the satellite constellation in FIG. 7, based on an example embodiment.

In an example embodiment, each orbit plane is selected such that there is an alternating ascending-descending pattern between adjacent orbital planes 904, as shown in FIG. 8. FIG. 9 shows the polar view 900 of the constellation 800 in FIG. 8, which shows that there exist orbital "seams" 906 indicated by the dotted lines between every adjacent orbit planes 904. For example, adjacent satellites are moving in opposite directions with one ascending, moving towards North Pole 902 and one descending, moving away from North Pole 902.

Figure 10:
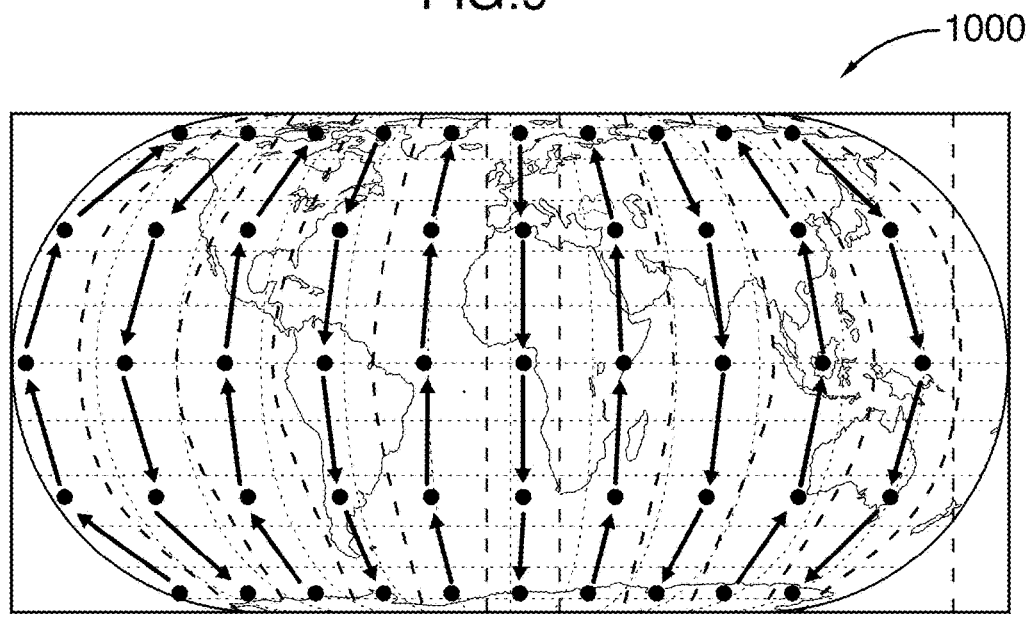
FIG. 10 illustrates a 2D schematic view of the constellation in FIG. 7, according to an example embodiment.

For further clarity, FIG. 10 shows a two dimensional representation 1000 of the constellation 800 shown in FIG. 8. Between network satellites within the constellation, there is no cross-plane communications because of the large relative velocities (approximately 15 km/s). In general, this alternating ascending-descending pattern can be applied to a constellation with any number of orbital planes.

Figure 11A:
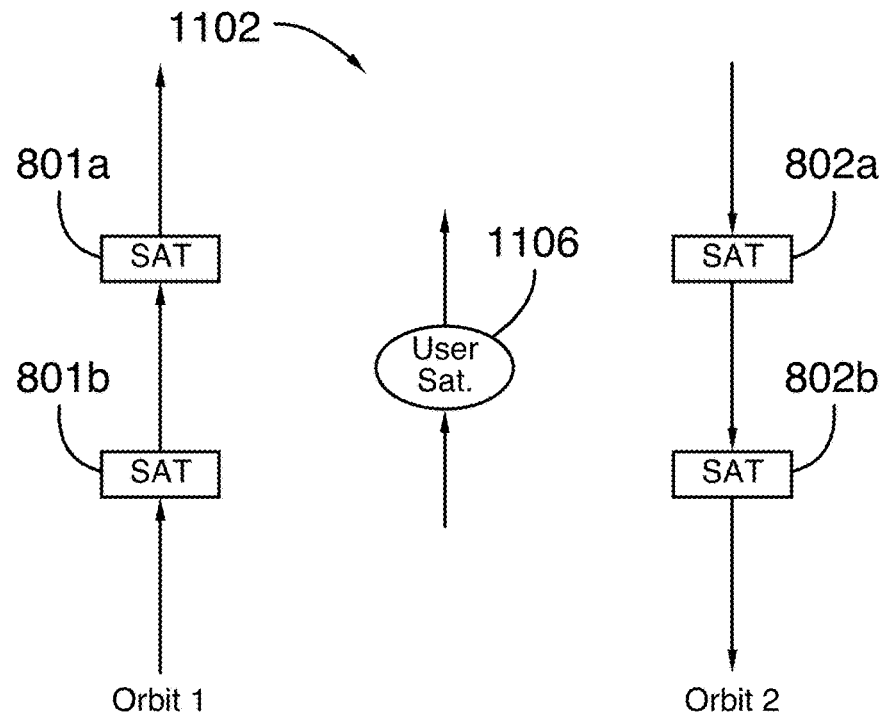
FIGS. 11A and 11B illustrate network satellites in ascending-descending adjacent planes with an external satellite between them, according to an example embodiment.
Figure 11B:
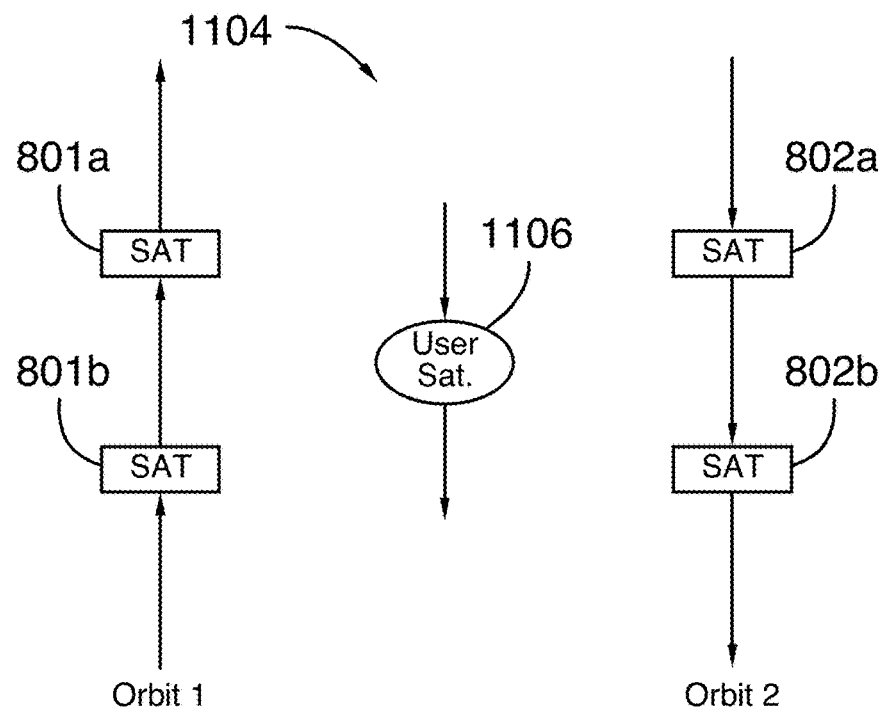

A feature behind this ascending-descending pattern is so that there is always an adjacent satellite with low relative velocity, and hence small Doppler shift within the LOS of any possible user satellite. FIGS. 11A and 11B respectively show orbits patterns 1102, 1104 including the user satellite 1106 (e.g. external satellite or 3rd party satellite) and at least one of the network satellites, denoted as 801a, 801b, 802a, 802b. Arrows in FIGS. 11A and 11B indicate the direction of travel of the satellites. In both FIGS. 11A and 11B, network satellites 801a and 801b are in the same orbit and network satellites 802a and 802b are in the adjacent orbit travelling in the opposite direction as network satellites 801a and 801b. In FIG. 11A, the user satellite 1106 is in an orbit that is about an equal distance from the orbit of network satellites 801a and 801b and the orbit of network satellites 802a and 802b. In FIG. 11A, the user satellite 1106 is able to communicate with network satellites 801a or 801b without a high relative velocity. Similarly, in FIG. 11B, the user satellite 1106 is able to communicate with network satellites 802a or 80b without a high relative velocity. A feature of having a lower relative velocity between the user satellite 1106 and the network satellites 801a, 801b, 802a, 802b would not have been possible had 801a, 801b, 802a, 802b traveled in the same direction. Hence, it may be appreciated that the ascending-descending pattern with overlapping communication range between satellites 801a, 801b, 802a, 802b in adjacent orbit is able to yield a lower relative velocity between the user satellite 1106 and at least one of the network satellites 801a, 801b, 802a, 802b.

Figure 12:
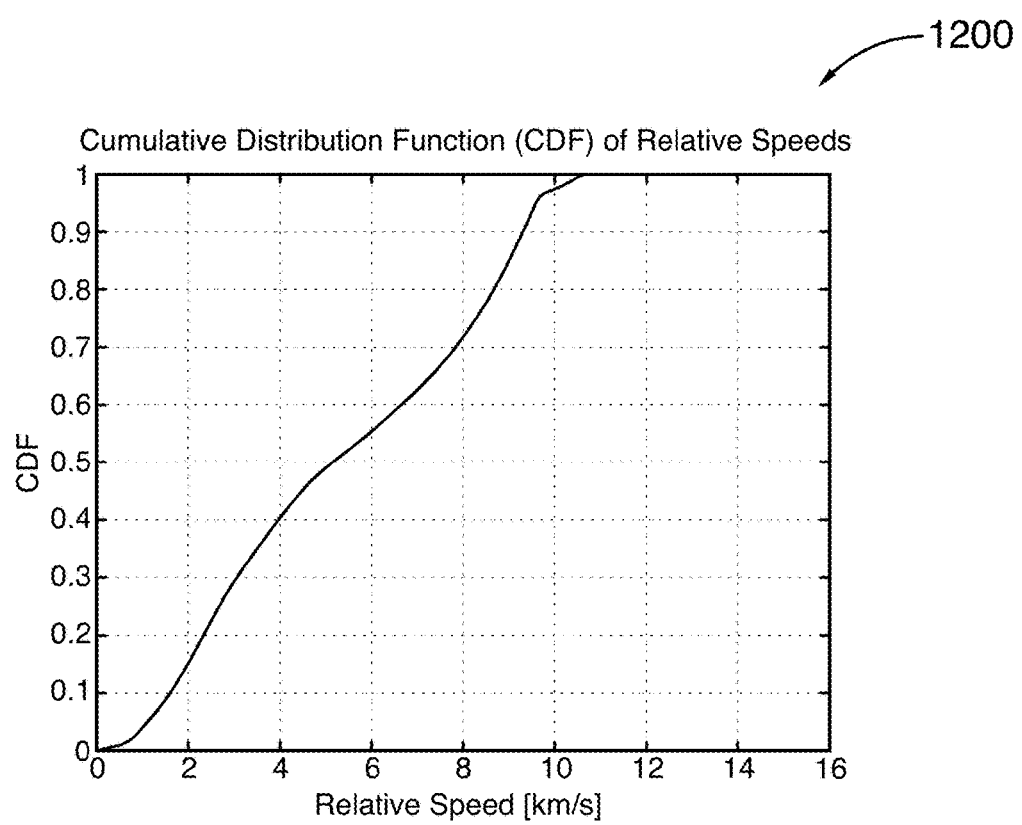
FIG. 12 illustrates a graph showing the result of a Monte Carlo simulation showing the CDF of the relative speed of a user satellite with respect to the satellite constellation, in accordance with an example embodiment.
Figure 13:
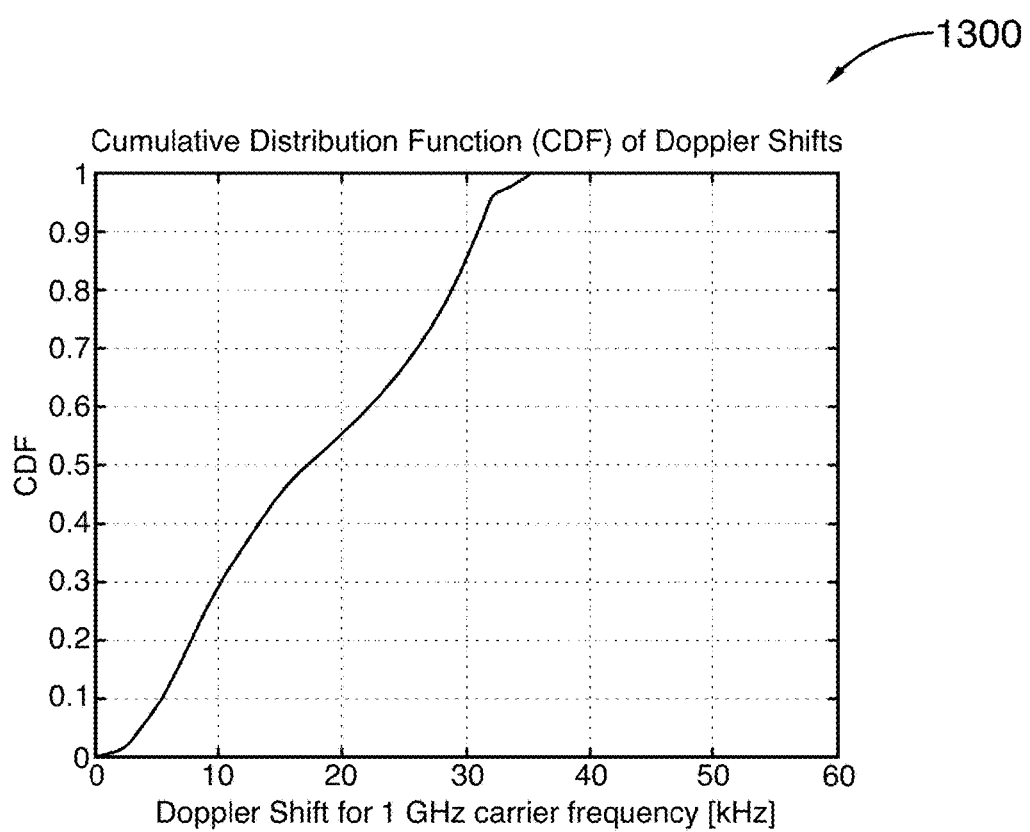
FIG. 13 illustrates a graph with the results of a Monte Carlo simulation showing the CDF of the Doppler Shift that a user satellite has to cope with when communicating with the satellite constellation, in accordance with an example embodiment.

FIG. 12 and FIG. 13 show a Monte Carlo simulation that illustrates the distribution of Doppler shifts 1300 and relative speeds 1200 for user satellites utilizing this system. As previously implemented for the evaluation of the constellation found in prior art, the simulation randomly sampled possible orbits in altitudes ranging from 300 to 800 km and random inclinations and RAANs. Using these sampled orbits, a random position and direction along the orbit is sampled to determine which network satellites the user satellite can communicate with via LOS. In every case, the user satellite chooses to connect with a network satellite that minimizes the Doppler shift, or equivalently, the relative speed. Aggregating this data, FIG. 12 and FIG. 13 show that the user satellite can communicate with the constellation at a Doppler shift below 16 kHz per GHz of carrier frequency 50% of the time. This corresponds to a 36% reduction in the magnitude of the Doppler shift, or equivalently, the relative speed, in comparison to the result of a Monte Carlo simulation for communicating with constellation found in prior art as shown in FIG. 4 and FIG. 5.

Figure 14:
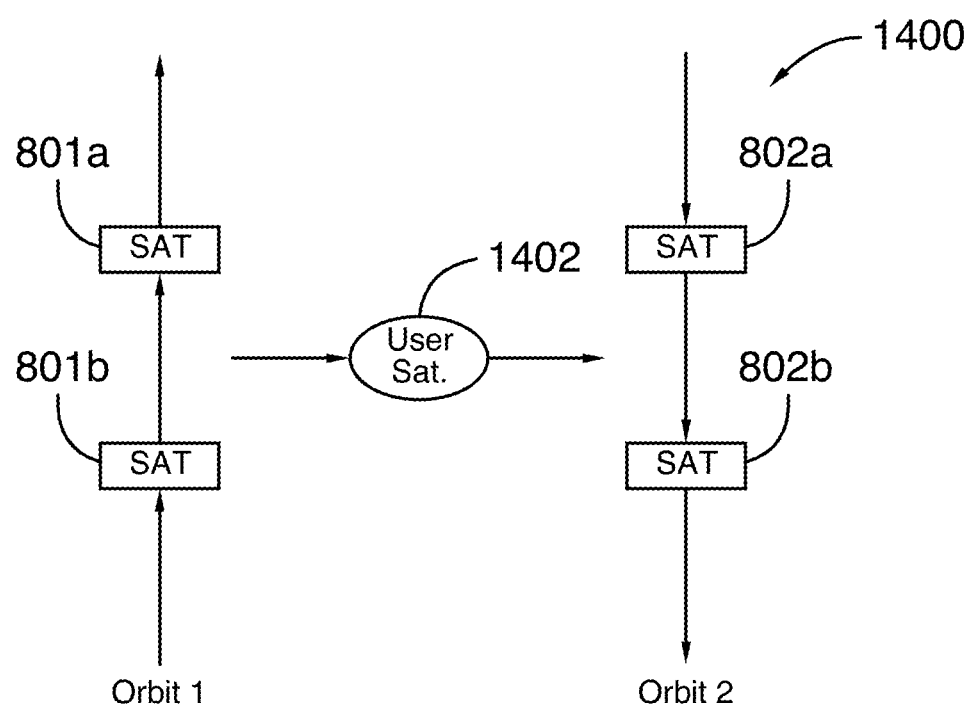
FIG. 14 illustrates network satellites in ascending-descending adjacent planes with an external satellite between them and in a different orbital plane, according to an example embodiment.

Furthermore, in the aforementioned example of parallel or roughly parallel orbits between user and network satellites, as shown in FIGS. 11A and 11B, the user satellite maintains communications with the adjacent satellite over its orbit, and handover is non-existent. However, in the case where orbits are non-parallel, such as those shown in FIG. 14, the illustrated ascending-descending constellation orbital pattern 1400 allows easy handoff. As the user satellite 1402 approaches Orbit 1 (the orbit in which network satellites 801a and 801b are in), it will track network satellite 801a. Once it passes the Orbit 1 plane, the user satellite will now track network satellite 802a of the Orbit 2 plane, which is simplified because the initial projected position of 802a is similar to the final projected position of 801a in this example. This prevents the need for the satellite to slew significant amounts, which both complicates handover and increase network latency when crossing planes.

Network satellites in the system are only required to have two ISLs for communicating within the constellation, in an example embodiment. The ISLs can be in the forward and aft (e.g. backward) directions relative to the direction of motion. There is no required inter-satellite link between satellites in different orbital planes within the constellation, in an example embodiment. Out-of-plane inter-satellite communications are only provided between user and network satellites in the constellation, in an example embodiment. The communication link between network satellites and user satellites shall be denoted as User Satellite Link (USL). Any required cross-plane communications for constellation management purposes is achieved via routing data through the ground stations and subsequently the Internet, which function as the indirect link across satellites in different orbital planes within the constellation. The communication link between satellites in the constellation and ground stations shall be denoted as Ground Link (GL).

Network Segment Inter-Satellite Link (ISL) Communication

In an example embodiment, ISLs are achieved through the use of a reconfigurable and electronically steerable high gain X-band Radio Frequency (RF) phased array antenna, which provides high gain narrow beam pointing without the need for a mechanical gimbal for the antenna or spacecraft body pointing. Alternatively, the use of S- or Ka-band for ISL is also possible depending on the data rate required to support the network. Either a fixed antenna set at a constant off-angle or reconfigurable antenna electrically steerable is used for inter-satellite links.

Figure 15:
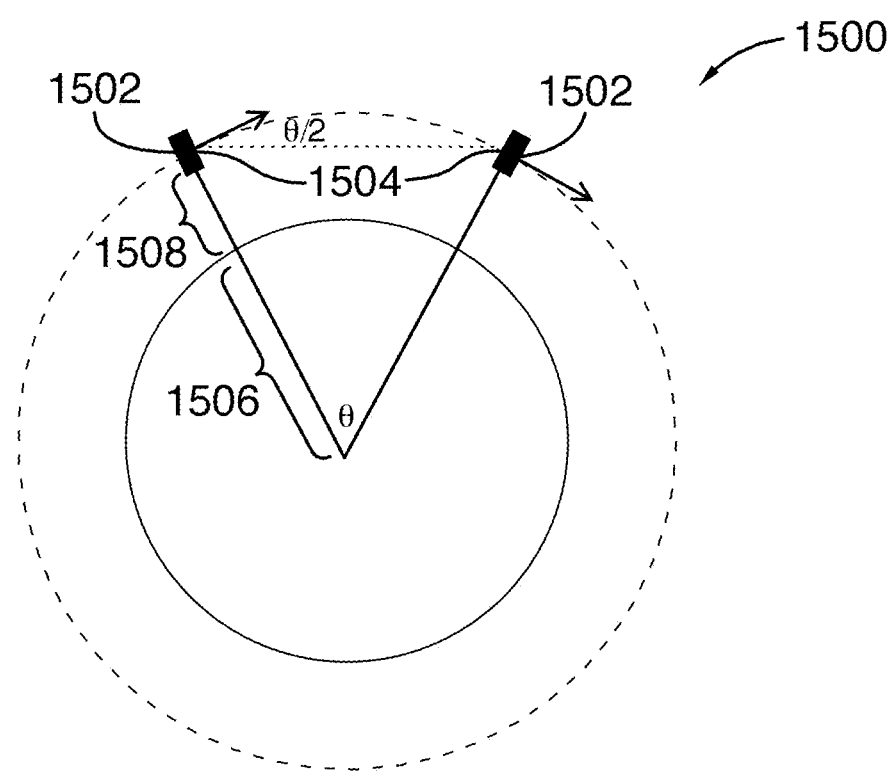
FIG. 15 illustrates a schematic showing the difference in angle between satellite direction of motion and antenna boresight required for communications with adjacent network satellite, according to an example embodiment.

In another example embodiment, the ISLs can be established through the use of an RF patch antenna that has a half power beam with (HPBW) angle that is larger than the angle between antenna boresight and the straight line connecting the network satellites within the orbit, as shown in the schematic 1500 of FIG. 15. For 10 equally spaced satellites in the orbit, the separation angle between two satellites 1502, θ, is 36° (=360°/10) and hence the angle between antenna boresight 1504 and the straight line connecting the two satellites is 18°. In this example, an RF patch antenna with HPBW of at least 18° can allow an ISL to be established between the two satellites 1502. Alternatively, for an RF antenna that has a HPBW narrower than the desired angle, which is usually the case for a high gain RF antenna, the aforementioned antenna can be mounted at a fixed angle relative to the satellite body in order to establish an ISL with the adjacent network satellite 1502.

In yet another example embodiment, ISLs are achieved through the use of free space optical (FSO) communication. FSO offers the ability to communicate at very high data rates using limited power as compared to RF ISLs. In addition, the use of FSO communication forgoes the need for large antennas to support the necessary gain to communicate over large ISL distances. In this embodiment, very accurate Pointing, Acquisition and Tracking (PAT) systems are used to align ISLs within the laser beam width.

User Segment and User Satellite Link (USL) Communication

The user segment includes any geocentric satellite within communications range of the network segment, for example can be an external satellite or third party satellite. Examples of satellites in the user segment include Earth-imaging satellites, ship tracking satellites, weather monitoring satellites, asteroid mining satellites, asteroid prospecting mission satellites, and space observation satellites. In an example embodiment, the user segment comprises of nanosatellites (1-10 kg). Alternatively, the user segment can include satellites of any class ranging from microsatellite (1-50 kg) to large satellites (>500 kg).

In an example embodiment, the user segment may include a standalone communications module consisting of a configurable or reconfigurable antenna and transceiver to facilitate network connection with the satellite network. During network establishment, orbital parameters (e.g. two-line elements) can be uploaded to the communications module for situational awareness, and can be periodically updated. An on-board lookup table can provide the required pointing vector to establish a link with the network segment. The communications module may include attitude determination sensors, or in another embodiment may rely on the sensors provided by the user satellite. Other features of the communications module can include adaptive bit throttling to change data rate as a function of link distance, which can ensure a constant bit-error rate. In an example embodiment of the communications module, a small deployable antenna is included within the module. This antenna may be stowed during launch and can deploy when the satellite begins operation to increase the overall surface area for communications.

In an example embodiment, the USLs are achieved through the use of a reconfigurable and electronically steerable RF phased array antenna. USLs in an example embodiment can be radio waves in the S-band, which generally have a frequency range of 2-4 GHz and a wavelength range of 15-7.5 cm. Alternatively, X-band and Ka-band can also be used to establish USLs depending on the data rate requirements. X-band generally has a frequency range of 8-12 GHz and a wavelength range of 3.75-2.5 cm. Ka-band generally has a frequency range of 26.5-40 GHz and a wavelength range of 1.11-7.5 cm. Furthermore, a phased array antenna can enable multiple USLs to be established between one network satellite and a plurality of user satellites (e.g. one to many communication).

In another example embodiment, rather than using the electrically reconfigurable phased arrays, the user satellite may be required to point to the satellites in the network segment establish a USL. However, due to the maximum slew rate that a satellite can generate from the on-board actuators, there is a minimum distance that the USL can be established and maintained when there exists a relative velocity between the user satellite and satellites in the network segment. The calculation of minimum USL distance, $D_{min}$, is as follows $$D_{min} = \frac{\Delta V}{\tan\dot{\theta}_{max}}$$

where $\Delta V$ is the relative velocity and $\dot{\theta}_{max}$ is the maximum slew rate that the user satellite can generate. For example, the maximum satellite slew rate from reaction wheel is typically 1.5°/s and assuming a relative velocity of 15 km/s (e.g. relative velocity of two satellites travelling in opposite direction), $D_{min}$ is approximately 500 km. This creates regions around the satellites in the network segment where the user satellite is unable to establish and maintain a link with the network segment. Evidently, a constellation design that minimizes relative velocity between satellites in the constellation and the user satellite, which minimizes regions of non-connectivity, is used in an example embodiment.

In yet another example embodiment, USLs can be achieved through the use of FSO communication. Similar to the description above for FSO communication, an accurate PAT system is used on the user satellite to align the satellites within the laser beam width.

In an example embodiment, satellites in the network segment are in higher altitudes than satellites in the user segment. Having satellites in the network segment in a higher altitude than satellites in the user segment creates a minimum separation between the satellites. This minimizes the minimum USL distance, $D_{min}$, as described above, which allows for a more complete orbital coverage by the network satellites. Furthermore, this also allows for a simpler design or modification required on the user satellite to establish and maintain connectivity to the satellites in the network segment as the antenna to communicate with the satellites in the network segment can be mounted on the top face of the satellite (e.g. the satellite face that is not ground facing). This reduces the interference with any ground communication device that the user satellite may have. However, as mentioned above, network satellites in a higher altitude are subjected to a larger ISL distance, which will degrade the link quality and requires consideration when designing the satellite.

In yet another example embodiment, external satellites in the user segment are in substantially similar orbit as the network satellites in the network segment. This example embodiment is a scenario when satellites in the user segment are launched together with satellites in the network segment. In this example, the relative velocity between the satellites in network segment and user segment is very low and constant communication to satellites in the user segment can be provided with minimal tracking and pointing.

Ground Segment

The ground segment consists of a plurality of ground stations strategically located in order to maintain constant and high data capacity communications with the satellites in the network segment. This ground segment is also connected to the data distribution system for distribution of satellite data to the end user over the Internet. The data distribution system can aggregate data from all ground stations in the ground segment. In an example embodiment, this is done using an Internet connection sending/receiving files over secure File Transfer Protocol (FTP) to/from the ground stations. In another embodiment, the link to the data distribution system can be a physical wire (e.g. Ethernet). In yet another embodiment, the link to the data distribution system can be done via ad-hoc wireless connection, either through RF links or FSO links.

In an example embodiment, selection of ground station location for the ground segment depends on the following criteria:
1. At least one satellite in each orbital plane of the network segment has to be within the LOS of at least one ground station at all times;
2. The ground stations have to be inter-connected through the Internet;
3. The ground stations have to be sufficiently far from population to minimize interference.

In an example embodiment, ground station locations are selected in major cities with high data capacity Internet connections at longitudinal increments of around 36°, as shown in Table 1. Longitudinal increment of around 36° is chosen because the orbital planes in the network segment in an example embodiment are polar or near polar orbits separated by 36° (e.g. 5 polar orbits equally spaced between 0° and 180°). The selected ground station locations at these longitudinal increments can allow for criterion 1 in the list of criteria above to be met.

Figure 16:
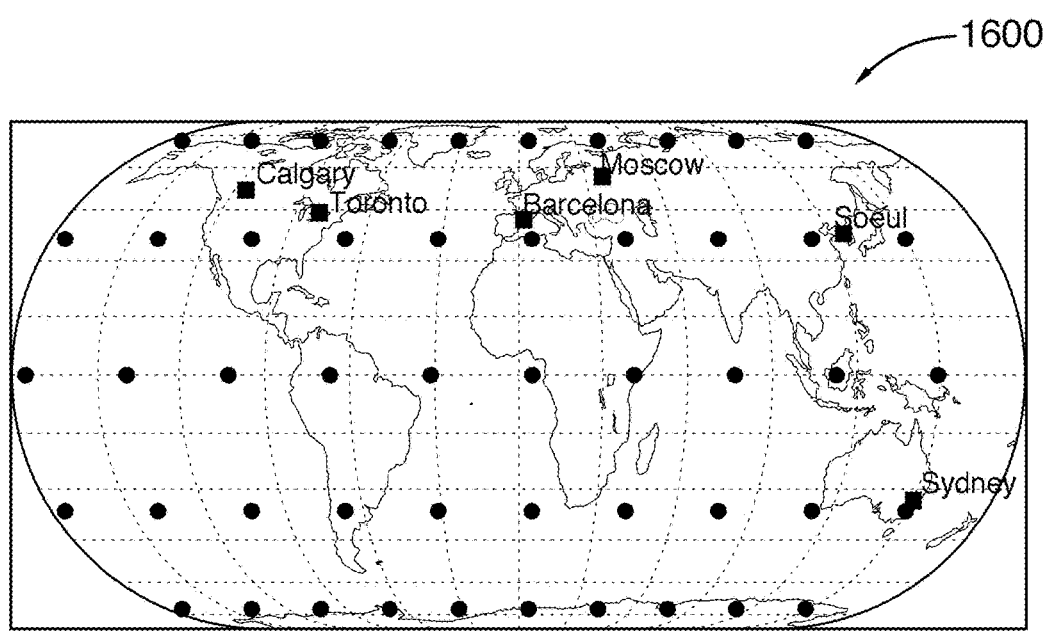
FIG. 16 illustrates the distribution of satellite and ground stations, according to an example embodiment.
Figure 17:
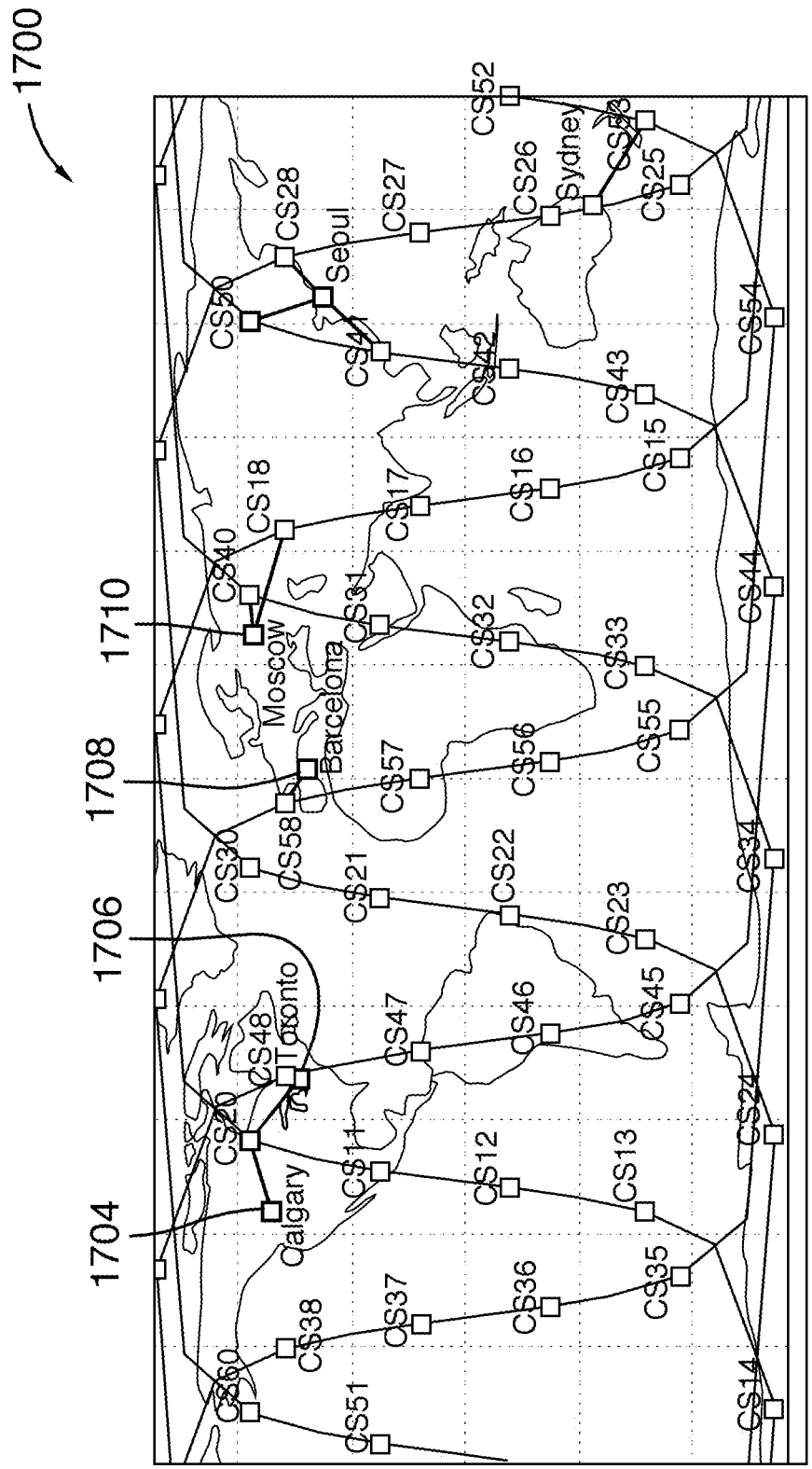
FIG. 17 illustrates the satellite constellation including the satellite and ground station locations, according to an example embodiment.

The distribution of satellite and ground stations of an example embodiment is shown in FIG. 16. FIG. 17 shows the satellite constellation in the network segment and ground station locations in the ground segment of the example embodiment when in operation. In FIG. 16, the network satellites are illustrated by circular dots and the ground stations are represented by square dots. In FIG. 17, the network satellites are illustrated as square dots with "CS" followed by the network satellite number, and the ground stations illustrated as square dots and are labelled with the city names. Communication link between ground station and network satellites are represented by thicker lines.

The ground stations in the example embodiment are Calgary 1704, Toronto 1706, Barcelona 1708, Moscow 1710, Seoul 1712, and Sydney 1714. The following Table 1 illustrates locations of ground stations in the example embodiment, as well as their relative latitude.

TABLE 1

Locations of ground stations in the example embodiment, as well as their relative latitude, which is also shown in FIG. 17.

| Major City | Location | | Adjacent Station | |
|---|---|---|---|---|
| | Latitude | Longitude | Westward | Eastward |
| Calgary | 51.03 N | 114.04 W | Sydney (37.08) | Toronto (34.8) |
| Toronto | 43.42 N | 79.24 W | Calgary (34.8) | Seoul (47.34) |
| Barcelona | 41.23 N | 2.11 E | Sydney (30.99) | Moscow (35.26) |
| Moscow | 55.45 N | 37.37 E | Barcelona (35.26) | Toronto (41.87) |
| Seoul | 37.34 N | 126.58 E | Toronto (47.34) | Sydney (24.54) |
| Sydney | 33.51 N | 151.12 E | Seoul (24.54) | Calgary (37.08) |

In an alternate example embodiment, the number of ground station locations can be decreased by moving the ground stations towards the north or south poles for a constellation of polar or near polar orbits. This is possible because the separation distance between satellites in different orbital planes near the poles are smaller for a constellation of polar or near polar orbits. Hence, satellites in multiple orbital planes are within the LOS of one ground station at high latitudes. As a result, in the most extreme case a single ground station can be used at the North or South Pole.

For example, a single ground station site at Svalbard, Norway (77.875 N, 20.975 E) is sufficient to provide constant communication to a satellite constellation with ISL capabilities in the Sun-Synchronous orbit. A minimum of 2 tracking satellite dishes are required to track the leading and trailing satellite to ensure smooth network handoff. In yet another example, a ground station site at Inuvik, Canada (68.36 N, 133.72 W) and another at Esrange, Sweden (67.88 N, 21.12 E) can also be used to provide constant communications to satellite constellation with ISL capabilities in the Sun-synchronous orbit.

Ground Link (GL) Communication

Figure 18:
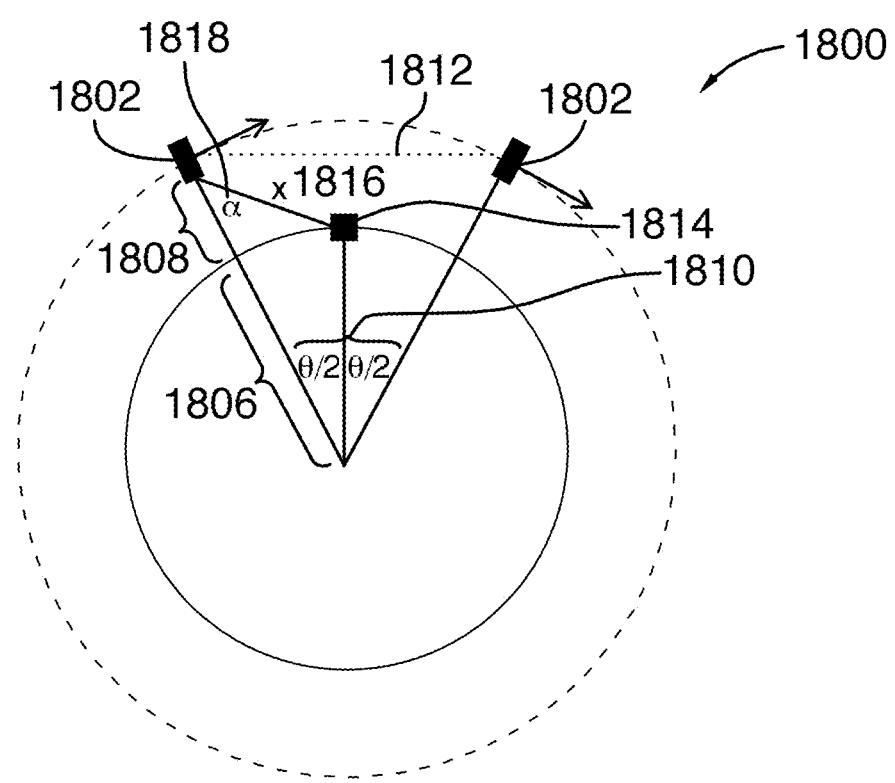
FIG. 18 illustrates a schematic showing the maximum difference in angle between nadir and antenna boresight during ground pass, according to an example embodiment.

Referring now to FIG. 18, in an example embodiment, the ground stations establish GLs with satellites by transmitting and receiving RF waves in the super high frequency (e.g. UHF/VHF bands) or extremely high frequency bands (e.g. S-, X- or Ka-bands). The RF ground stations typically consist of multiple large antenna dishes that are mechanically actuated to point at the satellites when they are within the ground station's LOS. In another example embodiment, the ground stations establish FSO communication links with the satellites in the network segment using mechanically gimbaled laser beam for pointing at the satellites and transmitting data to the satellites and aperture lens to capture and focus the received FSO signals onto a photodetector.

In order to maintain constant communications during a ground pass, the satellite in contact with the ground station is required to steer the GL antenna to point to the ground station in order to maintain communications. As shown in the schematic 1800 of FIG. 18, the maximum GL distance 1816, x, between the ground station 1814 and the satellite 1802, and the steering angle range 1818 for the GL antenna, α are $$x = \sqrt{(R_e + a)^2 + R_e^2 - 2(R_e + a)R_e \cos\frac{\theta}{2}}$$

$$\alpha = \cos^{-1}\left\{\frac{x^2 + (R_e + a)^2 - R_e^2}{2x(R_e + a)}\right\}$$

where $R_e$ is the radius 1806 of the Earth 1804, a is the altitude of the satellite 1808 and θ is the angle of separation 1810 between network satellites 1802 in the same orbit. In the example embodiment where the altitude of the network satellites 1802 are 600 km and the angle of separation 1810 between the network satellites 1802 is 36° (e.g. 10 equally spaced satellites in an orbit), the maximum GL distance is approximately 2170 km and the GL antenna steering angle range is approximately 65°.

In an example embodiment, GLs are facilitated through the use of reconfigurable phased array antenna on the satellites, providing high gain and narrow beam pointing without the need for mechanical steering. In another example embodiment, the GLs are established using an RF patch antenna on the satellite with a HPBW greater than α. This eliminates the need for the satellite to slew or steer the antenna to point to the ground station in order to establish the GL. However, the drawback of a wide HPBW RF antenna is the inherent low gain that results in a lower data rate achievable for the same ground station. In yet another example embodiment, an FSO communication with an accurate PAT system on the satellite may be used to establish a high data rate GL with an FSO ground station.

In operation, in an example embodiment, each network satellite can be configured to receive data from an external device such as a user satellite. The network satellite can then directly transmit the received data to the ground station when that network satellite is within a line-of-sight (LOS) of the ground station.

In the example embodiment, a network satellite (e.g. a first network satellite) can also indirectly transmit to the ground station. When the first network satellite is not within a LOS of the ground station, the network satellite is configured to transmit the received data to another adjacent coplanar network satellite (e.g. to a second network satellite). The second network satellite can then, if in LOS with the ground station, directly transmit the data to the ground station. Otherwise, the second network satellite can transmit the data to a third satellite which is an adjacent coplanar network satellite, and so on, for eventual transmission to the ground station. Accordingly, the first network satellite can directly or indirectly transmit to the ground station without having to wait to pass a ground station during the orbit.

This operation can also be performed in remove, for example so that a ground station can transmit data to a specific network satellite and/or to the user satellite. Accordingly, two-way communication may be achieved with the user satellite.

Real-Time Telemetry Tracking & Control (TT&C)

Telemetry Tracking & Control (TT&C) signals are often communicated from the spacecraft to a ground operator for the purposes of providing spacecraft position information and monitoring the health of the equipment on board the spacecraft. These signals can also be sent from the operator to the spacecraft for the purposes of tasking the spacecraft to change the mission profile. In both cases, the data being transmitted and received is often time sensitive.

Figure 19:
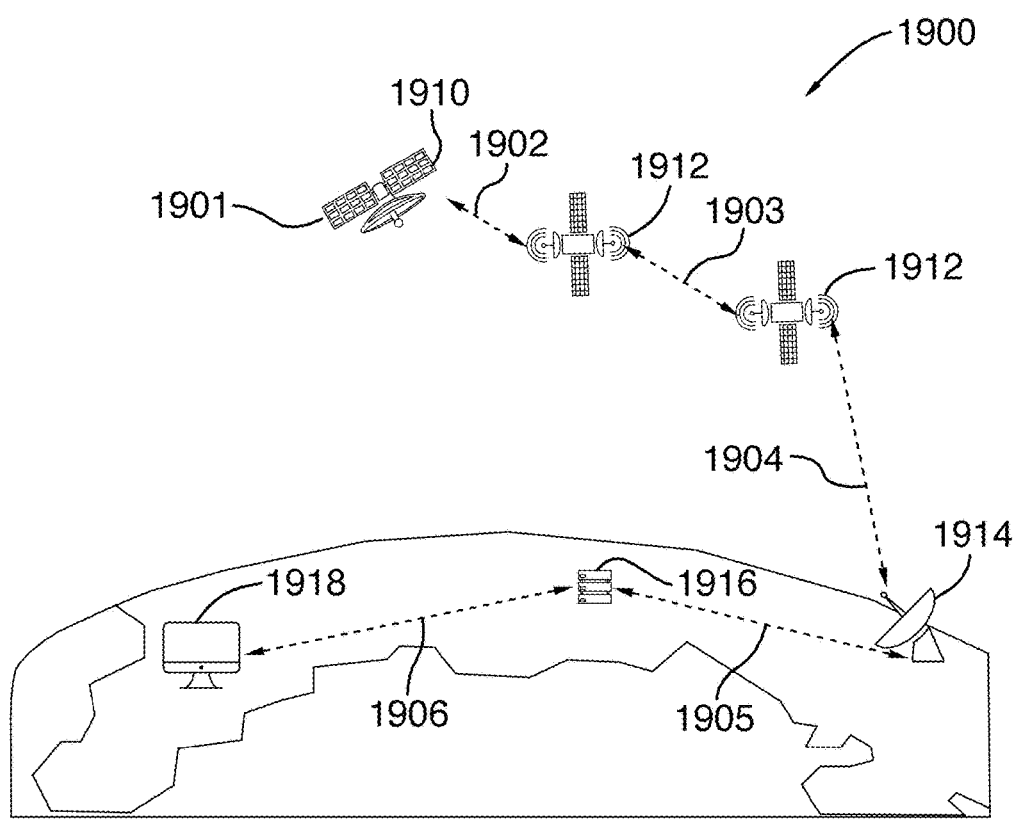
FIG. 19 illustrates a data relay system used to provide real-time Telemetry Tracking & Control (TT&C), according to an example embodiment.

In one example application of the described system, the data relay network can be used to provide this TT&C data in real-time from spacecraft to the operator and vice-versa. FIG. 19 shows how TT&C data can be sent from the customer satellite (e.g. the user segment in FIG. 6) to the satellite operator through the relay network (e.g. the network segment in FIG. 6), and vice-versa. As shown in FIG. 19, a customer satellite or a network satellite 1910 collects data from relevant sensors, such as for example gyroscopes or voltage sensors (step 1901). The customer satellite or a network satellite 1910 sends data to a satellite 1912 in the network segment that is within the communication range (step 1902). Data is then relayed within the satellites 1912 in the network segment using a transmission protocol, such as for example TCP/IP, FT-TCP/IP etc. (step 1903). When one of the satellites 1912 in the network segment is within the line-of-sight of a ground station in the ground segment, it sends the data to the ground station 1914 located on Earth 1920 (step 1904). The TT&C data acquired on the ground station 1914 is sent to a data distribution system 1916 (step 1905) ether over Internet, dedicated physical wire, or ad-hoc wireless connection. The spacecraft operator 1918 receives the TT&C data collected on their satellite (step 1918). In addition, the satellite operator may also relay data directly to the ground station (e.g. the ground segment in FIG. 6) when within line of sight.

Real-Time Aircraft and Ship Tracking

Aircraft often transmit data to air traffic control centers to notify them of their current position, heading and speed. In one example this is done over Automatic Dependent Surveillance-Broadcast (ADS-B), which will be mandated in the US by 2020. These transponders are typically limited to communicating within 250 Nautical Miles of a ground broadcasting station. Similarly, ships often transmit data around the world through Automatic Identification System (AIS) data, which is limited in ground communication rage to 50 Nautical Miles. Sometimes, AIS data can be sent and received from a satellite but typically the data is hours or days delayed.

Figure 20:
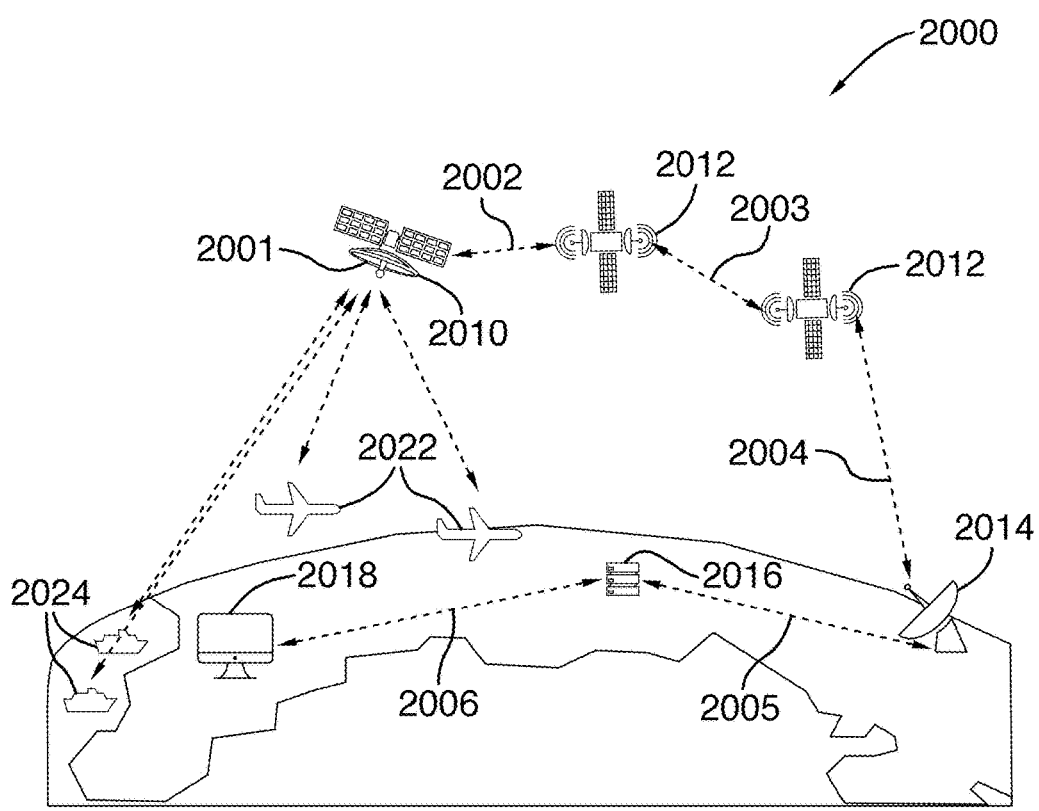
FIG. 20 illustrates a data relay system used to provide real-time Automatic Identification System (AIS) data and Automatic Dependent Surveillance-Broadcast (ADS-B) data, according to an example embodiment.

An application of the described system in accordance with at least some of the example embodiments may be the use of the relay network to develop a real-time aircraft and ship tracking network, as shown in FIG. 20. After data is collected from a customer satellite, or the relay network, it can be propagated through networked satellites to transmit the data to a ground station. As shown in FIG. 20, a customer satellite or a network satellite 2002 collects AIS or ADS-B data from one or more aircraft 2022 or one or more ships 2024 (step 2001). The customer satellite or the network satellite 2002 sends the data to a satellite 2012 in the network segment that is within the communication range (step 2002). The data is then relayed with the satellites 2012 in the network segment using a transmission protocol, such as for example TCP/IP, FT-TCP/IP etc. (step 2003). When the satellite 2012 in the network segment is within the line-of-sight of a ground station 2014 in the ground segment on Earth 2020, it sends the data to the ground station 2014 (step 2004). The AIS and/or ADS-B data that is acquired on the ground station 2014 is sent to a data distribution system 2016 (step 2005). The spacecraft operator or the customer 2018 receives the AIS/ADS-B data collected (step 2006). The benefit of this method is ability to receive the data in real-time, which may, for example, reduce ship accidents, and optimize flight paths for aircraft.

Real-Time Earth Observation

There are many users of satellite borne Earth observation data, ranging from governments for urban planning to researchers for atmospheric monitoring. The data they acquire from the instruments onboard a satellite also varies from still images to raw weather data. Many of the data source currently available can only provide satellite data that is hours or days delayed from the requested time. This is typically a feature of priority sequencing and lack of communications infrastructure.

Figure 21:
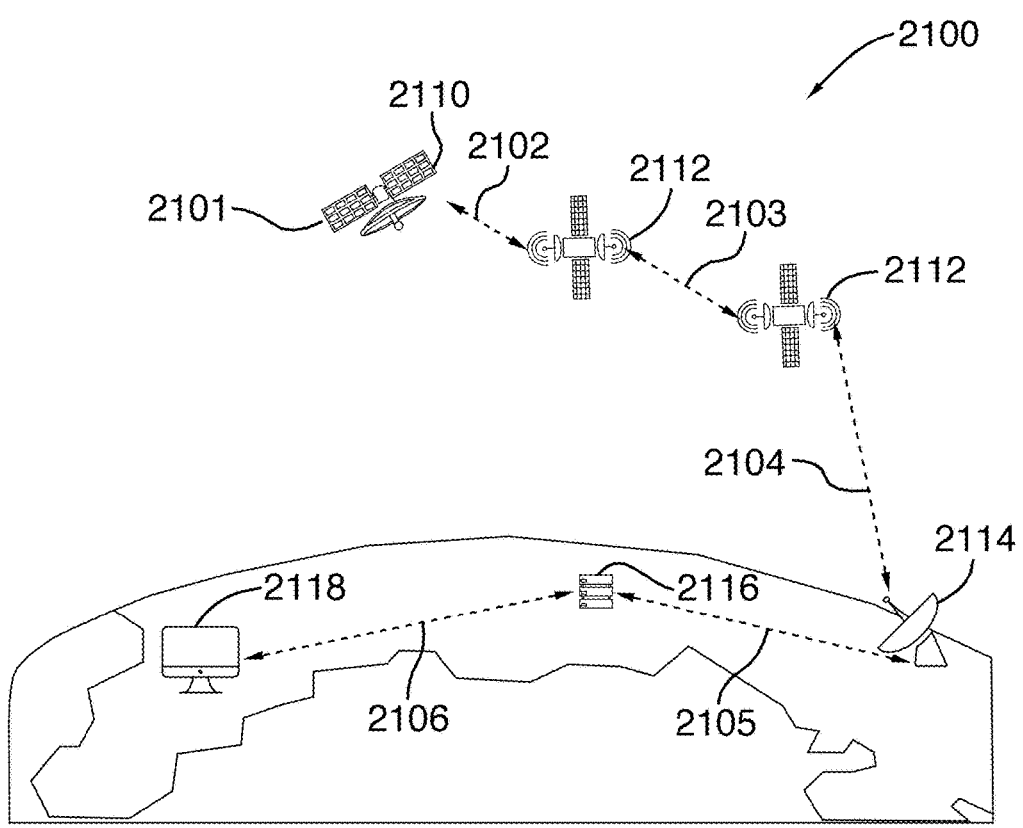
FIG. 21 illustrates a data relay system used to provide real-time Earth observation data, according to an example embodiment.

An application of the described system in accordance with at least some of the example embodiments may be to provide real-time Earth observation data as shown in FIG. 21. A customer satellite or a network satellite may host an instrument that can provide the necessary information, it may then relay the data through the satellite network and ground station(s) to the end user or spacecraft operator. As shown in FIG. 1, a customer satellite or network satellite 2110 collects Earth observation data from relevant sensors, such as for example a camera, $CO_2$ monitor etc. (step 2101). The customer satellite or the network satellite 2110 then sends this data to a satellite 2112 in the network segment that is within the communication range (step 2102). The data is relayed within the satellites 2112 in the network segment using a transmission protocol, such as for example TCP/IP/ FT-TCP/IP etc. (step 2103). When the satellite 2112 in the network segment is within the line-of-sight of a ground station 2114 in the ground segment on Earth 2120, it sends the data to the ground station 2114 (step 2104). The Earth observation data acquired on the ground station 2114 is sent to a data distribution system 2116 (step 2105). The spacecraft operator 2118 receives the Earth observation data collected on their satellite (step 2106). A feature of this method can be a higher capacity for user requests and the ability to service new markets (e.g. commodities traders) that require low latency data.

Ground Station

Figure 22:
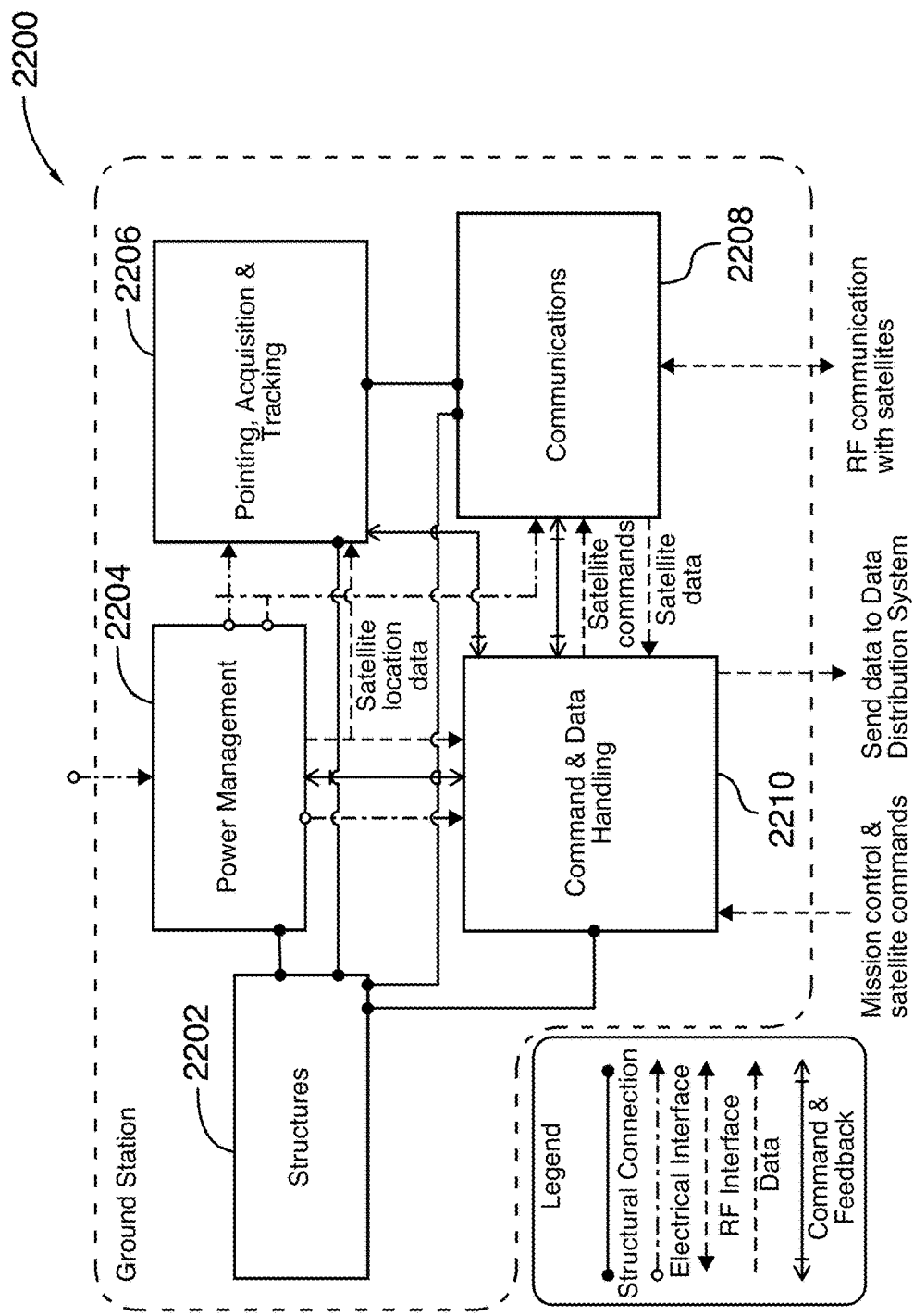
FIG. 22 illustrates a block diagram of an example ground station for use with the data relay system, in accordance with an example embodiment.

FIG. 22 illustrates an example ground station 2200 that may be used with the described system in accordance with at least some of the example embodiments. The ground station 2200 includes a power management subsystem 2204, a processor subsystem 2210 for command and data handling, a pointing, acquisition and tracking subsystem 2206, a communications subsystem 2208, and a structural interface and housing 2202 for all of the subsystems. The power management subsystem 2204 supplies and distributes electrical power to all sub-systems and provides circuit protection functions. The processor subsystem 2210 is for command and data handling, and processes and forwards received satellite data to a data distribution system. As well, the processor subsystem 2210 processes the received satellite and mission control commands from satellite operators and forwards them to the communications subsystem 2208. Also, the processor subsystem 2210 monitors all of the subsystems health. The pointing, acquisition and tracking subsystem 2206 computes a pointing angle based on the ground station location and the satellite location. As well, the pointing, acquisition and tracking subsystem 2206 steers antennas to point to a satellite and also tracks satellites during satellite ground pass. The communications subsystem 2208 includes a high gain antenna for receiving and transmitting RF signals from the satellites. As well, the communications subsystem 2208 includes a transceiver for modulating and demodulating the received signals and for implementing error correction codes and communication protocol.

Satellite

Figure 23:
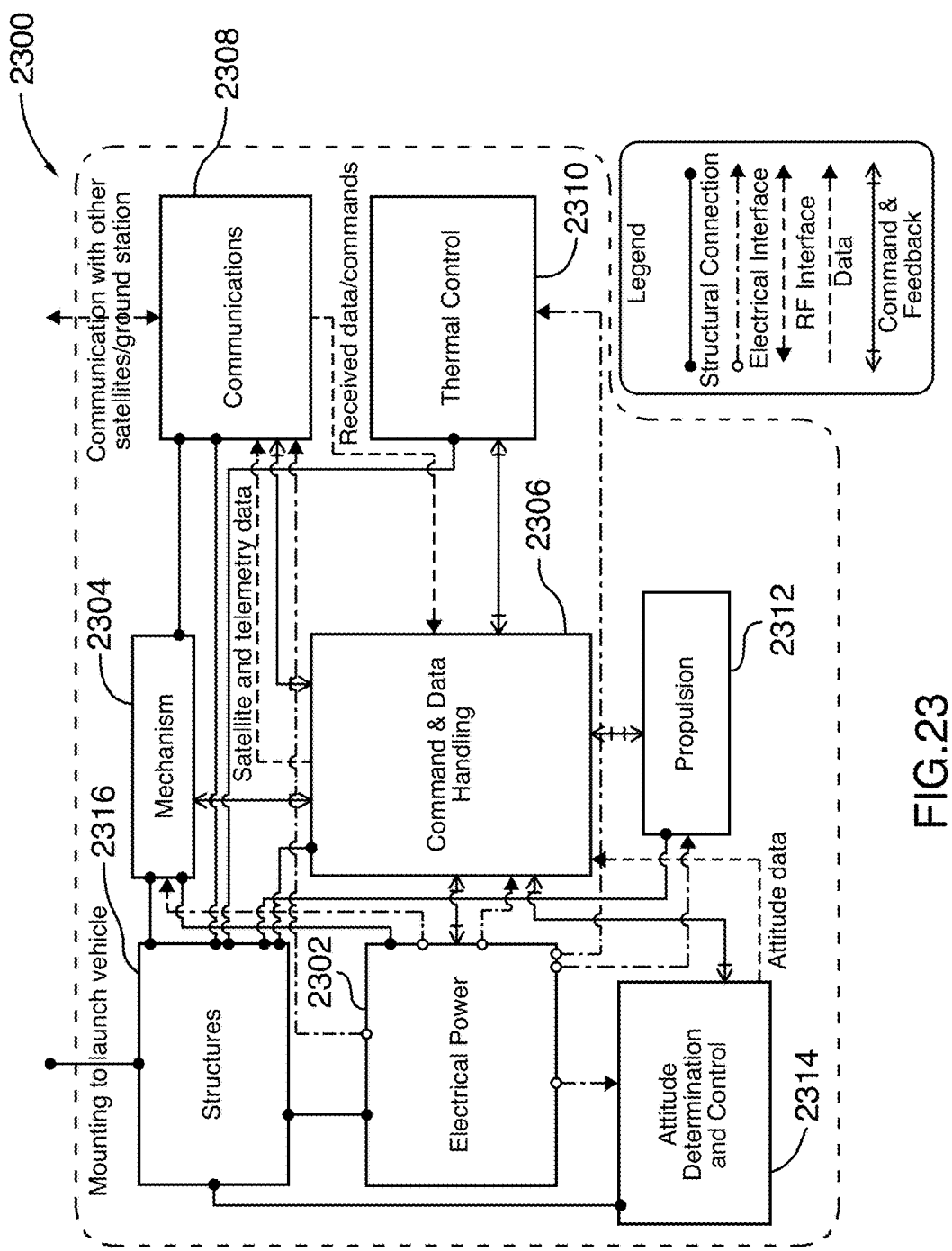
FIG. 23 illustrates a block diagram of an example satellite for use with the data relay system, in accordance with an example embodiment.

FIG. 23 illustrates an example satellite 2300 that may be used with the described system in accordance with at least some of the example embodiments. The satellite 2300 includes a power subsystem 2302, a mechanism subsystem 2304, a processor subsystem 2306 for command and data handling, a communications subsystem 2308, a thermal control subsystem 2310, a propulsion subsystem 2312, an altitude determination and control subsystem 2314 and a structural interface and housing 2316 for containing all of the subsystems. The power subsystem 2302 generates power such as solar power, and stores the generated electrical power (e.g. battery). As well, the power subsystem 2302 regulates and distributes the electrical power to all of the subsystems and provides bus over-current and battery under-voltage protection. The mechanism subsystem 2304 facilitates the deployment of the antennas and solar panels. The processor subsystem 2306 processes satellite commands received from satellite operators, generates and supplies instructions for all subsystems, stores generated or received data, provides on-board computing capabilities for data processing, determines target for communication based on a routing algorithm/scheduling system and monitors the health of all the subsystems. The communications subsystem 2308 includes an antenna for receiving and transmitting RF signals, a transceiver for modulating and demodulating the received signals and the subsystem 2308 implements error correction codes and communication protocol. The thermal control subsystem 2310 includes temperature sensors and provides temperature regulation (e.g. heating element) for circuits or components that are sensitive to extreme temperatures or temperature fluctuations. The propulsion subsystem 2312 deploys the satellite constellation and performs orbit maintenance of the formation. The altitude determination and control subsystem 2314 includes attitude sensors (e.g. sun/horizon sensor, magnetometer), estimates the satellite position and attitude, controls satellite attitude with actuations (e.g. reaction wheel, magnetorquers), and de-tumble satellite upon deployment (e.g. satellite rotation rate control). The structural interface and housing 2316 includes the external housing for all the subsystems, the structural interface between all of the subsystems, provides an electrical and thermal ground, and provides a radiation shield for internal components. At least some or all of the illustrated subsystems or blocks may include or be controlled by a processor, which executes instructions stored in a memory or computer readable medium.

According to an embodiment, there is provided a system for providing communications access to satellites, the system comprising: a plurality of network satellites surrounding the Earth in a plurality of orbital planes, wherein network satellites in adjacent orbital planes traverse the orbital planes in opposite directions from each other; and a plurality of ground stations in communication with the plurality of network satellites. In some embodiments, the plurality of orbital planes are polar or near polar planes. As well, in some embodiments the plurality of network satellites surrounds the Earth in Low Earth Orbit.

According to an embodiment, the system may further comprise a first communications subsystem for facilitating communication between adjacent coplanar network satellites. The first communications subsystem may be a radio frequency antenna. As well, the radio frequency antenna may be a phased array antenna. Also, the first communications subsystem may operate in the Ka-band.

According to an embodiment, the system may further comprise a second communications subsystem for facilitating communication between at least one of the plurality of network satellites and at least one external satellite, and in some example embodiments can includes same components as the first communications subsystem. The second communications subsystem may be a radio frequency phased array antenna operating in the Ku-band. In some embodiments, the at least one external satellite collects data and transmits the collected data to one of the plurality of network satellites. As well, the plurality of network satellites may be located at a higher altitude than the at least one external satellite.

According to an embodiment, the system may further comprise a third communications subsystem for facilitating communication between at least one of the plurality of satellites and at least one of the plurality of ground stations. The third communications subsystem may radio frequency antenna. Also, the radio frequency antenna may operate in UHF/VHF bands or Ku-band. In some example embodiments can the third communications subsystem includes same components as the first communications subsystem and/or the second communication subsystem.

According to an embodiment, the plurality of ground stations are inter-connected through a terrestrial communications network. As well, the plurality of ground stations may be positioned at a longitudinal increment of approximately 36 degrees. Also, in some example embodiments the network satellites are nanosatellites (e.g., 1-10 kg). In some example embodiments the network satellites are CubeSats, and may have a mass of on or about 1 kilogram per unit, and in some example embodiments may be no more than 1.33 kilograms per unit, for example.

According to an embodiment of the system, there are five orbital planes and ten network satellites in each of the five orbital planes. As well, the plurality of orbital planes may be equally spaced about the Right Ascension of the Ascending Node (RAAN). Also, the plurality of network satellites in each of the plurality of orbital planes may be equally spaced about the Mean Anomaly.

According to an embodiment, the system may further comprise a data distribution system for distributing satellite data to at least one computer over a terrestrial communications network.

According to an embodiment, there is provided a method for providing communications access to satellites on a system having a plurality of network satellites surrounding the Earth in a plurality of orbital planes, wherein network satellites in adjacent orbital planes traverse the orbital planes in opposite directions from each other, and having a plurality of ground stations in communication with the plurality of network satellites, the method comprising: receiving, at a first network satellite, data from an external satellite; transmitting, from the first network satellite, the received data to a first ground station when the first network satellite is within a line-of-sight (LOS) of the first ground station; transmitting, from the first ground station, the received data to a data distribution system over a terrestrial communication network.

According to an embodiment, the method further comprises transmitting the received data from the first network satellite to another adjacent coplanar network satellite if the first network satellite is not within a LOS of the first ground station.

According to an embodiment, the external satellite transmits data to the first network satellite when within a communication range of the first network satellite. The external satellite may collect data from sensors. As well, the plurality of network satellites may be located at a higher altitude than the external satellite.

While some of the present embodiments are described in terms of methods, a person of ordinary skill in the art will understand that present embodiments are also directed to various apparatus such as ground stations and satellites including components for performing at least some of the aspects and features of the described methods, be it by way of hardware components, software or any combination of the two, or in any other manner. Moreover, an article of manufacture for use with the apparatus, such as a prerecorded storage device or other similar non-transitory computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present example embodiments.

In the Figures, as applicable, at least some or all of the illustrated subsystems or blocks may include or be controlled by a processor, which executes instructions stored in a memory or computer readable medium.

The term "computer readable medium" as used herein includes any medium which can store instructions, program steps, or the like, for use by or execution by a computer or other computing device including, but not limited to: magnetic media, such as a diskette, a disk drive, a magnetic drum, a magneto-optical disk, a magnetic tape, a magnetic core memory, or the like; electronic storage, such as a random access memory (RAM) of any type including static RAM, dynamic RAM, synchronous dynamic RAM (SDRAM), a read-only memory (ROM), a programmable-read-only memory of any type including PROM, EPROM, EEPROM, FLASH, EAROM, a so-called "solid state disk", other electronic storage of any type including a charge-coupled device (CCD), or magnetic bubble memory, a portable electronic data-carrying card of any type including COMPACT FLASH, SECURE DIGITAL (SD-CARD), MEMORY STICK, and the like; and optical media such as a Compact Disc (CD), Digital Versatile Disc (DVD) or BLU-RAY Disc.

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the example embodiments, such variations being within the intended scope of the present disclosure. In particular, features from one or more of the above-described embodiments may be selected to create alternative embodiments comprised of a sub-combination of features, which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

Certain adaptations and modifications of the described embodiments can be made. Therefore, the above-discussed embodiments are considered to be illustrative and not restrictive.

The invention claimed is:

1. A system for providing communications access to satellites, the system comprising:
   a plurality of network satellites surrounding Earth each in one of a plurality of orbital planes, each orbital plane having coplanar network satellites of the plurality of network satellites, wherein network satellites in all adjacent orbital planes traverse the respective orbital planes in opposite directions from each other,
   each network satellite further includes a respective communications subsystem configured to communicate with an adjacent coplanar network satellite of the plurality of network satellites and configured to communicate with at least one external device which is external to the plurality of network satellites,
   wherein the at least one external device includes at least one ground station, wherein the at least one ground station is part of a plurality of ground stations which are inter-connected through a terrestrial communications network, wherein each network satellite is configured to communicate with an adjacent network satellite in an adjacent orbital plane only via the at least one ground station.

2. The system of claim 1, wherein the plurality of orbital planes are polar or near polar planes.

3. The system of claim 1, wherein the plurality of network satellites surround the Earth in Low Earth Orbit.

4. The system of claim 1, wherein each communications subsystem comprises a radio frequency antenna.

5. The system of claim 4, wherein the radio frequency antenna comprises a phased array antenna.

6. The system of claim 4, wherein each communications subsystem operates in Ka-band.

7. The system of claim 1, wherein each communications subsystem is for facilitating communication between the respective network satellite and at least one external satellite.

8. The system of claim 7, wherein the communications subsystem comprises a radio frequency phased array antenna operating in Ka-band for communication with the at least one external satellite.

9. The system of claim 7, wherein the at least one external satellite collects data and transmits the collected data to at least one of the plurality of network satellites.

10. The system of claim 7, wherein the plurality of network satellites are located at a higher altitude than the at least one external satellite.

11. The system of claim 7, wherein each of the network satellites is configured for communication with one of the external satellites that is in a generally same orbital direction as that network satellite, that network satellite being used for the communication with the one of the external satellites as opposed to the network satellites in adjacent orbital planes which orbit in the opposite directions, in order to reduce Doppler shift.

12. The system of claim 1, wherein the communications subsystem comprises a radio frequency antenna, wherein the radio frequency antenna operates in UHF band, VHF band or Ku-band.

13. The system of claim 1, further comprising a data distribution system for distributing satellite data received from the at least one ground station to at least one computer over a terrestrial communications network.

14. The system of claim 1, wherein the network satellites are less than 10 kilograms.

15. The system of claim 1, wherein there are five orbital planes and the plurality of network satellites comprises at least ten network satellites in each of the five orbital planes.

16. The system of claim 1, wherein the plurality of orbital planes are equally spaced about a Right Ascension of the Ascending Node (RAAN).

17. The system of claim 1, wherein the network satellites in each of the plurality of orbital planes are equally spaced about a Mean Anomaly.

18. The system of claim 1, wherein the at least one external device comprises an external satellite.

19. The system of claim 1, wherein each network satellite is configured to receive data from a first external device, and directly transmit the received data to a second external device when that network satellite is within a line-of-sight (LOS) of the second external device.

20. The system of claim 19, wherein each network satellite is further configured to transmit the received data to the adjacent coplanar network satellite of the plurality of network satellites when that network satellite is not within a LOS of the second external device for indirect transmission to the second external device.

21. The system of claim 1, further comprising the at least one external device.

22. The system of claim 1, further comprising the at least one ground station.

23. The system of claim 1, wherein each communications subsystem is configured to implement optical communications with the at least one ground station.

24. A method for providing communications access to a plurality of network satellites surrounding Earth each in one of a plurality of orbital planes, each orbital plane having coplanar network satellites of the plurality of network satellites, wherein network satellites in all adjacent orbital planes traverse the orbital planes in opposite directions from each other, each network satellite further includes a respective communications subsystem, the method comprising:

communicating, at a first network satellite of the plurality of network satellites, data with at least one external device which is external to the plurality of network satellites, wherein the at least one external device comprises a ground station, wherein the ground station is part of a plurality of ground stations which are inter-connected through a terrestrial communications network; and communicating, via the ground station, the data with an adjacent network satellite in an adjacent orbital plane to the first network satellite, wherein the first network satellite is configured to communicate with the adjacent network satellite in the adjacent orbital plane only via at least one of the plurality of ground stations.

25. The method of claim 24, wherein the data is directly transmitted from the first network satellite to the ground station when the first network satellite is within a line-of-sight (LOS) of the ground station.

26. The method of claim 25, further comprising transmitting, from the ground station, the data over the terrestrial communication network for the communicating with the adjacent network satellite.

27. The method of claim 26, wherein one ground station is located at Esrange, Sweden and another ground station is located in Inuvik, Canada to provide continuous communication with the plurality of network satellites, wherein the plurality of network satellites are in Sun Synchronous Orbit and have an inter-satellite link.

28. The method of claim 25, wherein one ground station is located at Svalbard, Sweden to provide constant communication with the plurality of network satellites, wherein the plurality of network satellites are in Sun Synchronous Orbit and have an inter-satellite link.

29. The method of claim 24, further comprising:
transmitting the data from the first network satellite to an adjacent coplanar network satellite when the first network satellite is not within a line-of-sight (LOS) of the ground station for indirect transmission to the ground station.

30. The method of claim 24, wherein the at least one external device comprises an external satellite.

31. The method of claim 30, wherein the first network satellite is configured to communicate data with the external satellite when within a communication range of the external satellite.

32. The method of claim 30, wherein the external satellite is configured to collect the data from sensors, and transmit the data to the first network satellite when within a communication range.

33. The method of claim 30, wherein the plurality of network satellites are located at a higher altitude than the external satellite.

* * * * *